United States Patent
Felder et al.

(10) Patent No.: US 11,814,484 B2
(45) Date of Patent: *Nov. 14, 2023

(54) MODIFIED FILLER PARTICLES AND SILICONE COMPOSITIONS COMPRISING THE SAME

(71) Applicant: Momentive Performance Materials GmbH, Leverkusen (DE)

(72) Inventors: Thorsten Felder, Dusseldorf (DE); Monika Friedrichs, Kerpen (DE); Gunnar Hoffmüller, Odenthal (DE); Abirami Srikanth, Bangalore (IN); Douglas Dukes, Troy, NY (US); Sumi Dinkar, Bangalore (IN); Roland Wagner, Bonn (DE); Karl Heinz Stachulla, Leverkusen (DE)

(73) Assignee: Momentive Performance Materials GmbH

(*) Notice: Subject to any disclaimer, the term of this patent is extended or adjusted under 35 U.S.C. 154(b) by 15 days.

This patent is subject to a terminal disclaimer.

(21) Appl. No.: 17/328,279

(22) Filed: May 24, 2021

(65) Prior Publication Data

US 2022/0002492 A1 Jan. 6, 2022

Related U.S. Application Data

(63) Continuation of application No. 15/745,449, filed as application No. PCT/EP2016/001267 on Jul. 20, 2016, now Pat. No. 11,015,024.

(60) Provisional application No. 62/194,545, filed on Jul. 20, 2015.

(51) Int. Cl.
| | | |
|---|---|---|
| C08G 77/08 | (2006.01) |
| C08G 77/14 | (2006.01) |
| C08K 3/22 | (2006.01) |
| C08L 83/06 | (2006.01) |
| C08L 83/04 | (2006.01) |
| C08L 83/00 | (2006.01) |
| C08K 5/49 | (2006.01) |
| C08J 3/02 | (2006.01) |
| C08J 5/18 | (2006.01) |
| C08G 77/20 | (2006.01) |
| C08G 77/00 | (2006.01) |

(52) U.S. Cl.
CPC ............ *C08G 77/08* (2013.01); *C08G 77/14* (2013.01); *C08J 3/02* (2013.01); *C08J 5/18* (2013.01); *C08K 3/22* (2013.01); *C08K 5/49* (2013.01); *C08L 83/00* (2013.01); *C08L 83/04* (2013.01); *C08L 83/06* (2013.01); *C08G 77/20* (2013.01); *C08G 77/70* (2013.01); *C08J 2383/04* (2013.01); *C08J 2383/06* (2013.01); *C08K 2003/2244* (2013.01); *C08K 2003/2296* (2013.01)

(58) Field of Classification Search
CPC ........ C08G 77/08; C08G 77/14; C08G 77/20; C08K 3/22; C08K 5/49; C08K 2003/2244; C08L 83/06; C08L 83/04; C08L 83/00; C08J 3/24; C08J 5/18
USPC .......................................................... 524/413
See application file for complete search history.

(56) References Cited

U.S. PATENT DOCUMENTS

| | | | |
|---|---|---|---|
| 4,421,904 A | 12/1983 | Eckberg et al. | |
| 7,834,083 B2 | 11/2010 | Shin et al. | |
| 8,173,743 B2 | 5/2012 | Hirano | |
| 8,329,290 B2 | 12/2012 | Hirano | |
| 2007/0004871 A1 | 1/2007 | Lu et al. | |
| 2010/0036051 A1 | 2/2010 | Hirano | |
| 2015/0164774 A1* | 6/2015 | Masatomi | C08L 83/04 424/59 |
| 2015/0252220 A1* | 9/2015 | Okawa | C09D 183/04 252/301.36 |

FOREIGN PATENT DOCUMENTS

| | | |
|---|---|---|
| JP | 10251486 A | 9/1998 |
| JP | 2010007057 A | 1/2010 |
| WO | 2012058271 A2 | 5/2012 |
| WO | 2013172921 A1 | 11/2013 |
| WO | 2014046309 A1 | 3/2014 |
| WO | 2014152686 A2 | 9/2014 |

OTHER PUBLICATIONS

Patent Cooperation Treaty (PCT), International Search Report and Written Opinion for Application PCT/EP2016/001267 filed Jul. 20, 2016, dated Dec. 16, 2016, International Searching Authority, EP.

* cited by examiner

*Primary Examiner* — Hui H Chin
(74) *Attorney, Agent, or Firm* — McDonald Hopkins LLC

(57) ABSTRACT

Composition of comprising nano metal oxide/hydroxide particles and a polyorganosiloxane having increased refractive index, processes to cure these compositions for making transparent coats, shaped articles by an extrusion or molding process having a refractive index above the refractive index of the polyorganosiloxane. Use of the cured polyorganosiloxane compositions as optical devices, coats, lenses or light guides.

16 Claims, No Drawings

MODIFIED FILLER PARTICLES AND SILICONE COMPOSITIONS COMPRISING THE SAME

CROSS-REFERENCE TO RELATED APPLICATIONS

The present application is a continuation of U.S. patent application Ser. No. 15/745,449 filed on Jan. 17, 2018, entitled "MODIFIED FILLER PARTICLES AND SILICONE COMPOSITIONS COMPRISING THE SAME," which is a national phase filing of International Patent Application No. PCT/EP2016/001267 filed on Jul. 20, 2016, which claims priority to U.S. Provisional Application No. 62/194,545, entitled "Modified Filler Particles and Silicone Compositions Comprising the Same," filed on Jul. 20, 2015, the disclosures of each of which are incorporated herein by reference in their entireties.

FIELD

The present subject matter provides a composition of polyorganosiloxanes nano crystalline metal oxides or hydroxides, and a process to disperse or crystallize these particles. The curable composition with the dispersed, optionally surface modified particles shows high refractive indices at good light transmission. The composition is suitable for the use in a variety of applications such as optical devices or light guides. The work leading to this invention has received funding from the European Union Seventh Framework Program (FP7-NMP-2010-LARGE-4) under "grant agreement" no. 263382.

BACKGROUND

Polyorganosiloxane polymers or copolymers having a high refractive index have been increasingly used for a variety of optical applications including, for example, in contact lenses, intraocular lenses, LED lenses etc. Such polymers are also finding their way into other optical applications requiring high transmission and high refractive index including but not limited to, solid state lighting (light emitting diodes, organic light emitting diodes, laser diodes), waveguides (both planar and "fiber" geometries), optical computing, optical storage media, antireflection coatings, conformal coatings, optical lenses, micro lenses, automobile topcoats, paint formulations, hair-care products, gradient refractive index optical components, dynamic gradient refractive index components, etc.

Depending on the application, the polymers and their cured compositions such as shaped articles may need to exhibit a wide range of properties including sufficient structural integrity, strength, elasticity and elongation, outstanding index of refraction, etc. Although the refractive index of usual polydimethylsiloxanes can be increased by specific substituents the achievable level is limited. It has been therefore proposed to disperse high refractive oxides in such polymers in order take advantage of the higher refractive index of the high refractive oxides. However, such concepts failed to give polyorganosiloxane compositions that provide the desired light transmission and in the same time an increased refractive index. There is always a conflict between the desirable high concentration of high refractive additives such as fillers, e.g. nano particles of oxides and the ability to end up with compositions which are applicable by known coating or injection processes for the manufacture of films or shaped articles. Many of these compositions suffer either on the particle size which are too big in size or tend to agglomerate at least under storage over the time or defects of optical properties. There was no clear conclusion on whether the refractive indices cannot get adjusted to the desired light transmission, agglomeration is an issue or sedimentation is the reason for failure. Without bond to theory it is believed that any have to do with one of these reasons.

In addition the composition comprising high refractive oxide must be handy in usual processes for the manufacture of films, coatings, shaped articles made by an extrusion or molding process. These process requirements need to design in addition the flow properties such as viscosity. In some applications, the polymers must exhibit these properties when formed into a thin film. For example, in intraocular lenses, the lens must be thin and pliable for insertion through a small incision in intraocular lens applications, and have sufficient structural integrity and strength to retain such shape under normal use conditions. It is desired to have a transmission of more than 90% for light with a wavelength between 300 to 1800 nm at thickness of 2 mm over more than 6 months. The refractive index of the composition shall be more than 1.55 measured as $n_D^{20}$ whereby the viscosity of the composition shall not exceed 50000000 mPa·s at 25° C. at a shear rate of D=10 sec−1.

One approach to increase the refractive index of binder polymer includes the use of a crystalline nano metal oxide in e.g. acrylate composition as disclosed in WO 2012/058271 A2. The examples are silent about the transparency of the composition in thick layers. It could be shown that improvements in transparency are still necessary for some of these materials.

There are many proposals in the prior art which substituents could be suitable for increasing the refractive index of polyorganosiloxanes. Some of the possible substituents are shown in WO 2014-152686 and WO 2013-172921 (Dukes et. al.).

A very well-known way is the use of phenyl substituted siloxanes as a polymer with increased refractive index. For example the introduction of aromatic groups results in dimethylsiloxane-phenylmethylsiloxane co-polymers or dimethylsiloxane-diphenylsiloxane co-polymers which are suitable candidates for polymers having an increased refractive index. Despite the positive effect on the refractive index, the introduction of refractive index modifying groups, such as phenyl-groups, in polyorganosiloxanes is known to result in several important disadvantages.

High concentrations of phenyl groups are however necessary to achieve higher refractive indices. Polyorganosiloxanes having more than 5 mol. % of phenylsiloxy groups have the tendency to crystallize and to be solid at room temperature. Additionally, increasing the phenyl content in polyorganosiloxanes leads also to a significant increase in the viscosities of such polymers in particular when used in compositions with fillers limits their processability.

Nevertheless the increase of the refractive index is limited to about $n_D^{20}$ of 1.6 for 100 mol. % for e.g., diphenylsiloxy units respectively for diphenylsiloxanes in addition such polymers could be solid at 25° C. or have at least a high viscosity, whereby usual fillers such as silicas can limit the refractive index of these polymers in composition down to about $n_D^{20}$ of 1.54 at 25° C. and increase the viscosity for another time. A good processability can only be achieved if a certain level of low viscosity at 25° C. is provided. Injection molding processes or extrusion processes may tolerate a higher viscosity than casting or film coating processes.

In addition, the pure polyorganosiloxanes containing phenyl groups without a reinforcing filler or a similar reinforcing resin is not suitable for the manufacture of articles wherein a certain level of mechanical strength is desired.

The inventors found a way to overcome the weakness of known systems with high refractive transparent compositions, wherein the filler is provided as stabilized dispersion and the light transmission adjusted as desired.

SUMMARY

The present subject matter provides a composition of nano crystalline metal oxides (A) or hydroxides and polyorganosiloxanes (B), a process to disperse or crystallize these particles. The invention discloses curable compositions with dispersed nano crystalline optionally surface modified particles which are showing high refractive indices and good light transmission in a broad range of wavelengths. There is also disclosed a process how the compositions can be cured. The compositions are useful for the manufacture of a variety of applications such as optical devices, lenses or light guides. In one aspect, the inventive compositions make use of an asymmetrically substituted polyorganosiloxane as binder as well as dispersing aid which can stabilize the dispersion of the filler and adjust the light transmission.

In one embodiment, the asymmetrically substituted polyorganosiloxane has the formula $R^4\text{-}\{\text{-}L[SiR_2O]_p\text{—}SiR_2\}_m\text{-}L\text{-}R^{4*}$, wherein the polyorganosiloxane has two different terminal groups.

The inventors have found polyorganosiloxanes which are useful as binder polymer having increased refractive index and can disperse and stabilize this dispersion than polyorganosiloxanes known in the state of the art.

The inventors have found a threshold value for the difference between metal oxide and the polyorganosiloxanes which allows minimizing the amount of expensive groups necessary for an increased refractive index and enough light transmission. In addition it was found that use of an asymmetrically substituted short chain polyorganosiloxane can at least disperse and stabilize the high refractive oxides in a binder polymer. It is even possible to use the asymmetrically substituted short chain polyorganosiloxane as binder polymer itself, since it allows the incorporation of high amounts high refractive oxides and can be furnished with reactive groups which can undergo curing reactions with each other.

DETAILED DESCRIPTION

The invention discloses a composition comprising metal oxide/hydroxide particles (A), one or more of a polyorganosiloxane (B), (B1) and (B2) selected from the group which consists of one or more substituted polyorganosiloxanes having units of the formulas (I),

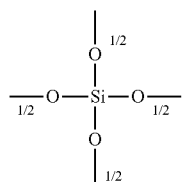
(Q)

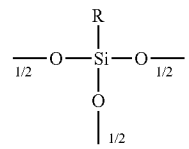
(T)

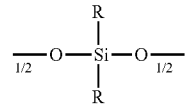
(D)

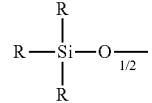
(M)

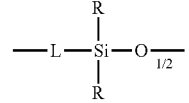
$M^L$ and

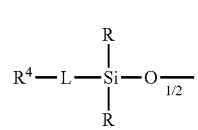
$M^{R3}$ wherein R are selected from the group of $R^1$ and $R^2$, $R^3$, $R^4$, L, and $R^1$ is selected from the group which consist of monovalent C1 to C22-alkyl, optionally substituted by Cl or F, and $R^2$ which is selected from the group consisting of monovalent unsubstituted or substituted alkenyl groups selected from C2-C22-alkenyl, and including $R^{22}$ which selected from C6-C22-cycloalkenyl, C7-C22-bicycloalkenyl, C6-C22-alkenylarylalkyl, optionally substituted by $R^1$, bonded via a carbon atom of a hydrocarbon group to the silicon atom of the siloxy unit, which may be interrupted by O, N atoms, and $R^3$ is a group $L\text{-}R^4$ forming $M^{R3}$ of formula (I), wherein $R^4$ is selected from the group of $R^1$, $R^2$, $R^{22}$, hydrogen, and a monovalent substituted or unsubstituted C4-C30-hydrocarbon unit optionally interrupted by —$NR^9$—, O, S or P atoms, substituted with $R^1$, OH, Cl, F, CN, OR9- consisting of C1-C22-alkyl, poly (F)-alkylene oxide $R^9$ terminated, $(R^1X)_xR^1_{3-x}Si\text{—}$, x=1-3, X=C1-C8 alkoxy, C1-C8-alkylcarboxy, C1-C8-alkylamino, and an ionic group derived from esters of carboxylic acids, S or P acids such as $R^9\text{—}C(O)\text{—}O\text{—}$, $(R^9\text{—}O)_2\text{—}P(O)\text{—}O\text{—}$, $(R^9\text{—}O)_2\text{—}P(O)\text{—}$, $(R^9\text{—}O)_2\text{—}P\text{—}O\text{—}$, —$NHR^9\text{—}CH_2\text{—}COOH$, —$NHR^9\text{—}CH_2\text{—}O\text{—}S(O)_2(OH)$, —$S\text{—}S(O)_2(OH)_2$, whereby $R^9$ is =hydrogen, C1-C8 alkyl, C2-C8-alkenyl, me$_3$Si—, and acid salts of amines, phosphines or preferably salts having quaternary —$N^+R^9_3$ or —$P^+R^9_3$ groups, and including $R^{42}$ selected from the group of $R^{22}$, C6-C22-cycloalkyl, C6-C12-cyclothioalkyl, C7-C22-bicycloalkyl, C6-C22-aryl, C5-C12-hetero-N, —O, —S-aryl, C8-C22-polycyclic aryl, C7-C22-alkylaryl, C7-C22-arylalkyl, C8-C22-arylalkylenearylalkyl, epoxides, of the group $R^2$, $R^{22}$, and $R^6_xR^1_{3-x}Si\text{—}$, wherein x=1-3, $R^6$=C6-C10-aryl, C7-C12-arylalkyl, C6-C12-cycloalkyl, C7-C16-bicycloalkyl, epoxy C3-C12-epoxy alkyl, C6-C12-cycloalkyl, epoxy C7-C16-bicycloalkyl, C6-C12-thiocycloalkyl, C5-C12-hetero-N, —O, —S-aryl,
bonded via a single bind or carbon bond of L to the silicon atom of the siloxy unit, whereby L is a single bond, a divalent or trivalent group, which is selected from the group which consists of C1 to C12-alkylene groups, which can be interrupted by one or more O, — or —$NR^9$—C(O)—, and/or —$NR^9$—, urethane —OC(O)$NR^9$—, urea —$NR^9$HC(O)N $R^9$—, moieties, and substituted by one or more OH groups, bonded via a carbon bond to the silicon atom of the siloxy unit, optionally one or more crosslinker (C) selected in addition from the group of silicon-free unsaturated C6-C30-hydrocarbons having more than 2 unsaturated groups, C6-C30-hydrocarbons having epoxy groups selected from the group of (B) consisting of the polyorganosiloxanes (B2) having an additional group $R^7$, wherein $R^7$ is hydrogen attached to Si (SiH), optionally one or more of a curing catalyst (D) selected from the group of radical initiators, hydrosilylation catalysts, condensation catalysts, catalysts for light-activated cationic polymerization, characterized in that at least one component (B) comprises more than 5 mol. % siloxy units which are substituted with $R^{22}$ and $R^{42}$ and has a refractive index $n_D^{20}$ of more than 1.43.

The inventors have found that the shortcomings of the compositions comprising metal oxide/hydroxide particles and polyorganosiloxanes as binder or matrix polymer could be removed. The invention provides a polyorganosiloxane composition which has a reasonable processability and in which the optical properties of the dispersed metal oxide/hydroxide nano particles can be stabilized. Previous problems of such compositions are resolved by the use of specific polyorganosiloxanes having selected structures and substituents.

The appropriate groups are selected from substituents useful for curing the polymer and groups which provide enough optical density respectively high refractive indices. In some embodiments of the invention both features can be realized with one substituent. The term metal oxide/hydroxide particles in this invention means nano-sized oxides with particles sizes below the wavelength of visible light. Some of the available particles are offered commercially as dispersion in a solvent and have already any added dispersion aid. Although the particle size of such nano metal oxides is in the desired range, the compositions state of the art with polyorganosiloxanes comprising them do not show perfect transparency respectively a sufficient light transmission over a broad range of wavelengths and over a longer period of time.

The inventors found a composition comprising a polysiloxane which is stabilizing the high refractive nano metal oxide particles against agglomeration and sedimentation and can overcome this problem present in previous compositions.

The novel polyorganosiloxanes of the invention are enabling the manufacture and use of compositions which provide a reasonable stability against agglomeration, sedimentation of the metal oxide particles and are showing good optical properties like light transmission over a broad range of wavelength and in thick sections. The compositions include a polyorganosiloxane (B) comprising the units M, D, T and Q, having the structure of the empirical formula (II)

$$[M_aD_bT_cQ_dL_e]_f \quad (II)$$

wherein:
a=0 to 6,
b=0 to 2000,
c=0 to 50,
d=0 or 1
e=0 to 6
f=1 to 200, if d=1 or Q is present
wherein a+c+d>0, and the viscosity at 25° C. is below 200000 mPa·s at a shear rate at D=10 sec$^{-1}$.

The empirical formula may express that the selected structures of the polyorganosiloxanes are suitable in particular for the inventive composition. These types of polymers comprise linear and branched structures of relative low molecular weight. In view of the cost aspect and the amount of expensive groups $R^2$, $R^3$, $R^4$ and $R^6$ in particular the so-called optical dense groups $R^{22}$ and $R^{42}$, which have a high impact on the overall refractive index and therefor shall be selected under the aspect of highest efficiency with respect to the overall costs. It was found that a threshold value of the refractive index $n_D^{20}$ should exceed 1.43 in order to achieve a higher refractive index of 1.6 to 1.7 of the total composition under incorporation of high refractive particles having a refractive level above of that value. This lowest necessary level of refractive indices for the polyorganosilxane (B) can suitably be met e.g. with 6 mol. % siloxy units substituted with appropriate optical dense groups $R^3$, $R^6$. The amount of reactive groups like $R^2$ and $R^4$ which can contribute to the creation of a network after a cure reaction are chosen to such an extent as determined by the desired mechanical properties of the cured article or coat; i.e. a rubber-like behavior needs fewer reactive groups than a resin-like article having a duromeric appearance. For a rubber-like appearance the reactive groups $R^2$ or those in $R^4$ should not exceed 20 mol. % of all siloxy groups.

The polyorganosiloxane (B), (B1) and (B2) formula (I) or (II) are selected from the group of polyorganosiloxanes (B) comprising symmetrical and asymmetrical substituted polyorganosiloxane (B) of formula (IIIa) to (IIIe)

$$M\text{-}D^{R1}_u\text{-}D^{R2}_v\text{-}D^{R3}_w\text{-}M^* \quad (IIIa)$$

$$R^4\text{-}\{\text{-}L[SiR_2O]_p\text{—}SiR_2\}_m\text{-}L\text{-}R^{4*} \quad (IIIb)$$

m=1 to 7
p=1 to 9,
wherein
u=0 to 500
v=0-50 preferably 0-20
w=0-500 preferably 1-100

$$[M_{0.4\text{-}4}Q]_{1\text{-}200} \quad (IIIc)$$

$$[M_{0.4\text{-}4}D_{1\text{-}10}Q]_{1\text{-}200} \quad (IIId)$$

$$M_{2\text{-}10}D_{0\text{-}500}T_{1\text{-}10} \quad (IIIe),$$

wherein M and M* are selected from the group of $M^{R1}$, $M^{R2}$, $M^{R3}$,
x=0 to 2
T selected from $T^{R1}$, $T^{R2}$, $T^{R3}$,

D is selected from $D^{R1}$, $D^{R2}$, $D^{R3}$,
$D^{R1}=R^1{}_2SiO$
$D^{R2}=R^1{}_y R_{2-y}SiO$
$D^{R3}=R^1{}_y R_{2-y}SiO$
  y=0 to 1,
characterized in that at least one polyorganosiloxane (B) comprises more than 5 mol. % siloxy units which are substituted with $R^{22}$ and $R^{42}$.

These structures may express that the substituents $R^1$ to $R^3$ can be placed at many different positions of the silicon atoms of the inventive polyorganosiloxanes (B), however there are some particularly desirable structural elements, which are easily accessible with the basic silanes of the industrial silicon chemistry.

Such structural elements use precursors starting from, e.g.,

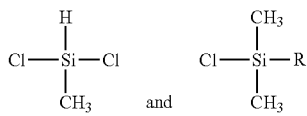

R=$R^2$, $R^3$, $R^4$, $R^7$

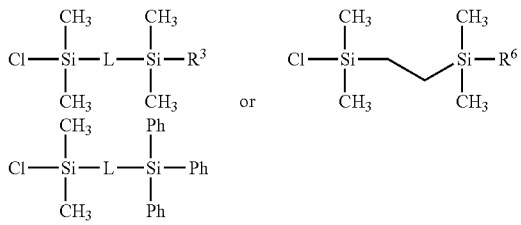

Ph=phenyl;
Examples for the L-$R^3$ may be shown by the following formula

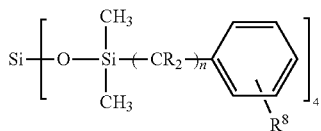

$R^8$ is selected from the groups $R^{10}$ to $R^{14}$, for example
$R^{10}$, $R^{14}$ is hydrogen or $R^1$ and $R^{11}$, $R^{12}$, $R^{13}$ are selected from —$OR^9$, forming groups,
$R^6me_2Si$—, wherein $R^6$=C6-C10-aryl, C7-C12-arylalkyl, C6-C12-cycloalkyl, C7-C16-bicycloalkyl, C6-C12-cyclothioalkyl, C5-C12-hetero-N, —O—, —S-aryl, optionally substituted by R1, OH, Cl, and a silyl ether group $R^1{}_3Si$—O—, and of unsubstituted or substituted oxyphenyl moieties, wherein the group

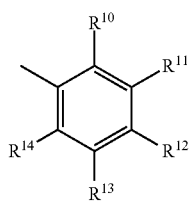

is substituted with $R^{10}$ to $R^{14}$,
  whereby at least one of the groups $R^{11}$ to $R^{13}$ is an OH group, bonded via L to the silicon atom of the siloxy unit.

Another precursor can start from methyldichlorohydrogensilane:

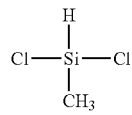

In a next hydrosilylation step a compound with one or two unsaturated groups can be added.

If not all SiH groups are reacted in the hydrosiyllation reaction the polyorganohydrogensiloxane is a molecule as defined under (B2) and can serve as crosslinker for a polymer (B1) which provides unsaturated groups.

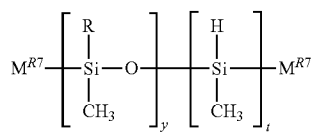

y=u, v, w,
$M^{R7}=R^1{}_x R^7{}_{3-x} SiO_{1/2}$ $me_3SiO_{1/2}$, $Hme_2SiO_{1/2}$
x=2 or 3
the indices u, v, w, are as defined above
t=0 to 100
R=$R^2$, $R^3$, and $R^4$,
M-$D^{R1}{}_u$-$D^{R3}{}_w$-$D^{R2}{}_v$-$D^{R7}{}_t$-M
$D^{R7}$=HMeSiO
$R^3$ is -L-$R^4$ One particularly suitable $R^4$ group is an alkoxysilyl substituent of the structure $(R^1O)_x R^1{}_{3-x} Si$— where x is 3.

The polyorganosiloxane (B) further comprises the unit L.
In addition to the aforementioned groups L, further suitable groups L are selected from
  L1 and L2 which both are independently selected form the group which consists of a single bond, —$CH_2CH_2$—, —$CH_2CH_2O$—, —$CH_2CH_2CH_2O$—, —$CH(CH_3)CH_2O$, —CH=$CHCH_2O$—, —CH=CHC(O)—, and —$C(CH_2O$—)=$CHCH_2O$—;

Other examples for the group $R^2$ are —CH=$CH_2$, —$CH_2CH$=$CH_2$, —$(CH_2)_4CH$=$CH_2$, —C(O)$(CH_2)_8CH$=$CH_2$, —$CH_2C$≡CH, —C(O)C≡CH, —$(CH_2CH_2O)_a$—$(CH_2CH(CH_3))_b$—$(CH_2CH_2CH(CH_3))_c$—OCH=$CH_2$, —$(CH_2CH_2O)_a$—$(CH_2CH(CH_3))_b$—$(CH_2CH_2CH(CH_3))_c$—OCH$_2$CH=$CH_2$, —[Si$(CH_3)_2OSi(CH_3)_2$]CH=$CH_2$;

with a, b, and c are independently 0 to 20, in one embodiment, 0 and 1 to 20, and a+b+c is 0 to 20, in one embodiment 0, and in another embodiment 1 to 20, Examples for the group $R^{22}$ where the alkylene group $R^2$ provides a higher optical density, i.e. higher refractive index, are

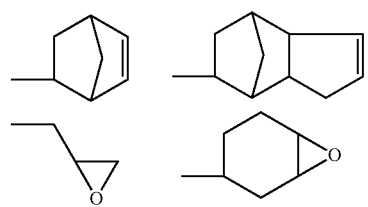

-continued

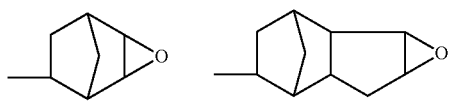

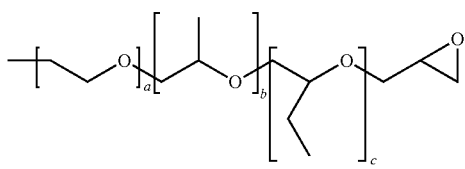

with a, b, c are independently 0 to 20, in one embodiment 0, and in another embodiment 1 to 20, and a+b+c is 0 to 20, in one embodiment 0, and in another embodiment 1 to 20, or $R^{62}$ is

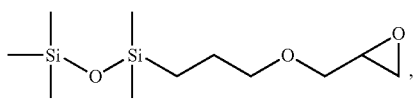 [SMILES: C[Si](C)(C)O[Si](C)(C)CCCOCC1CO1]

Suitable precursors for $R^{22}$ can also be selected from

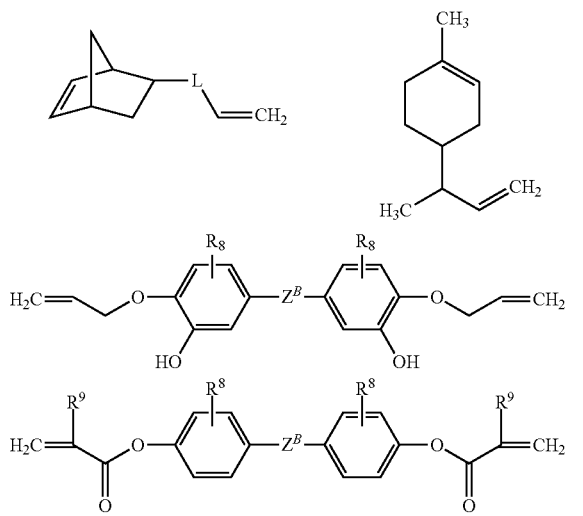

and $Z^B$ is selected from the following groups:

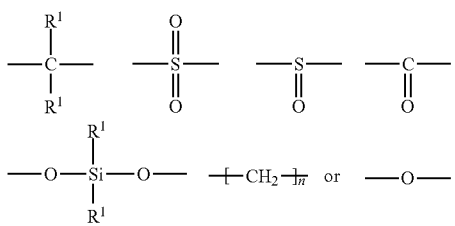

$R^3$ is a group L-$R^4$

Wherein $R^4$ comprises a group $R^{42}$ i.e. a group $R^4$ having higher optical density which are selected from the group of $R^{22}$, C6-C22-cycloalkyl, C6-C12-cyclothioalkyl, C7-C22-bicycloalkyl, C6-C22-aryl, C5-C12-hetero-N, —O—, —S-aryl, C8-C22-polycyclic aryl, C7-C22-alkylaryl, C7-C22-arylalkyl, C8-C22-arylalkylenearylalkyl, epoxides, of the group $R^2$, $R^{22}$, and $R^6{}_x R^1{}_{3-x}$Si—, wherein x=1-3, $R^6$=C6-C10-aryl, C7-C12-arylalkyl, C6-C12-cycloalkyl, C7-C16-bicycloalkyl, epoxy C3-C12-epoxy alkyl, C6-C12-cycloalkyl, epoxy C7-C16-bicycloalkyl, C6-C12-thiocycloalkyl, C5-C12-hetero-N, —O, —S-aryl, bonded via a single bind or carbon bond of L to the silicon atom of the siloxy unit, Preferred suitable groups $R^{42}$ are cumylphenolether, bisphenolethers, phenyl, biphenyl, naphthyl benzhydryl, cinnamyl, phenethyl, styryl, trityl, anthryl, phenanthryl, chrysyl, aryl substituted thiophene, thiadiazole, thianthrene, carbozole, 9-allylcarbazol, indol, phosphazenes, phosphonates and derivatives thereof;

epoxides of $R^2$ and $R^{22}$ such as C6-C22-epoxyalkyl, C6-C22-epoxycycloalkyl, C4-C12-dioxolane, C5-C12-thiophene, C3-C12-1,3-dithiolane, C3-C12-1,3,5-trithiane, C4-C2-1,3-dithiane, C5-C12-tetrahydro-2H-thiopyran other examples for the group -L-$R^4$ or L-$R^{42}$ are

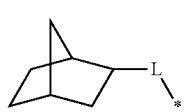

For example preferred groups $R^{42}$ are at L are

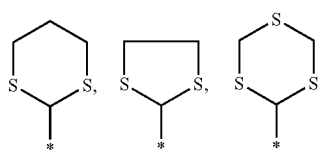

1,3-dithiane, 1,3-dithiolane, 1,3,5-trithiane or cumylphenol ether, bisphenolether derivatives.

Precursors for $R^{42}$ can be

H-Siph$_3$, alkenyl-Siph$_3$, vinyl-Siph$_3$, alkenyl-Sime$_2$R$^6$ N-vinyl-carbazol,

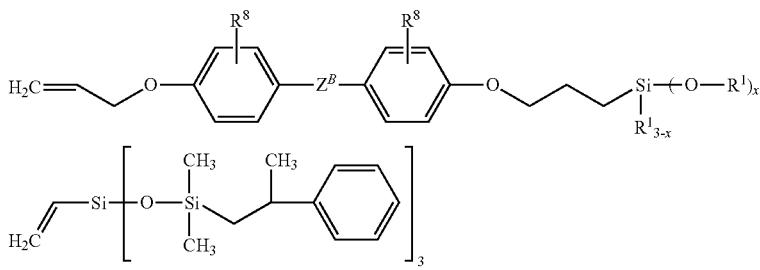

Examples for the groups for $R^{42}$ after addition may be trisorganosilyl, trisphenylsilyl, trismethylsilyl, phenylpropyldimethylsilyl, styryldimethylsilyl, vinyldimethylsilyl, trisalkenylsilyl, trisvinylsilyl, vinyldimethylsilyl

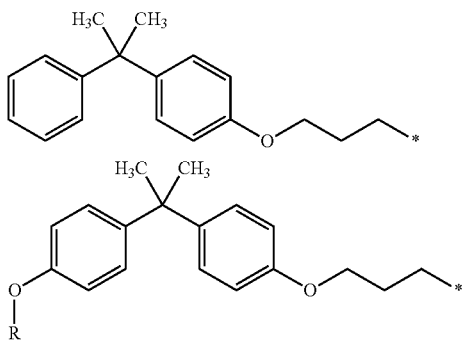

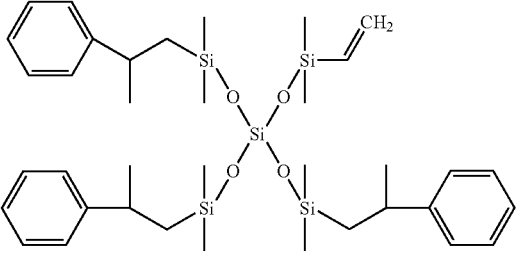

In one embodiment the polyorganosiloxane (B1) used in one of the examples has the structure $M\text{-}D^{R1}{}_u\text{-}D^{R3}{}_w\text{-}D^{R2}{}_v M$
$D^{R1}=me_2SiO$
$D^{R2}=vinylmeSiO$
$D^{R3}=w1=Ph_2SiO$ ph=phenyl and
w2: $(ph_3\text{-}Si\text{—}C_2H_4)meSiO$ Suitable structures for polyorganosiloxane (B1) include, but are not limited to,

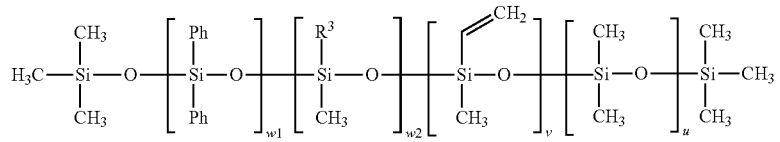

u=2
w=w1+w2, i.e., w1=2; w2=3.6
v=4.2
$R^3$=Ph=phenyl or $R^3=(CH_2)_2$—$SiPh_3$, $SiPh_3$ A molecule of this structure has the following properties $n_D{}^{20}=1.555$ viscosity 100 Pa·s at 25° C.

In one embodiment the polyorganosiloxane (B2) used in one of the examples has the structure $M\text{-}D^{R1}{}_u\text{-}D^{R3}{}_w\text{-}D^{R7}{}_t\text{-}M$ such as

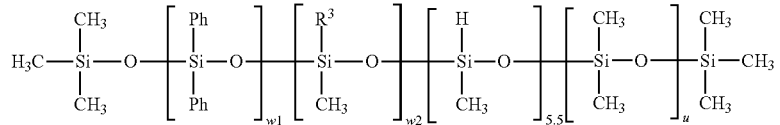

t=5.5
u=2
w=w1+w2 w1=2, w2=3.5
Ph=phenyl
R$^3$=—C2H$_4$-Siph$_3$

Another molecule of (B2) has the following properties $n_D^{20}$=1.5504 viscosity 18 Pa·s at 25° C.

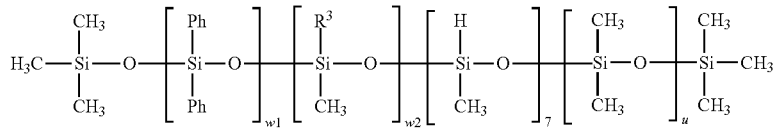

u=2
w=w1+w2 w1=2, w2=4
Ph=phenyl
R$^3$=cumylphenol

This concrete molecule has the following properties $n_D^{20}$=1.5448, viscosity 4.74 Pa·s at 25° C., 92.5% transmission at 400 nm.

In another embodiment of the polyorganosiloxanes (B) used in the inventive composition, at least one of the polyorganosiloxanes (B) is selected from the group of formula $M^{R2}$-$D^{R1}_u$-$D^{R2}_v$-$D^{R3}_w$-$M^{R2}$,

[M$_{0.4-4}$Q]$_{1-200}$,
[M$_{0.4-4}$ D$_{1-10}$ Q]$_{1-200}$,
M$_{2-10}$D$_{0-500}$T$_{1-10}$, and
M$_{2-10}$D$_{0-500}$T$_{1-10}$, wherein
the M and M* are units are selected from the group of M$^{R1}$, M$^{R2}$, M$^{R3}$,
the D units are selected from D$^{R1}$, D$^{R2}$, D$^{R3}$,
the T units are selected from T$^{R1}$, T$^{R2}$, T$^{R3}$
whereby R$^1$=methyl, 3,3,3-trifluoropropyl
u=0 to 200
v=0-20
w=1 to 200, and
R$^4$-{-L[SiR$_2$O]$_p$—SiR$^2$}$_m$-L-R$^{4*}$,
R$^2$ is selected from vinyl, allyl, hexenyl, octenyl, R$^{22}$
  selected from cyclohexenylethyl, limonyl, norbornenyl, norbornenethyl, vinylphenylethyl, C2-C8-alkenylphenylether, C2-C8-alkenylbiphenylether, allyloxyphenyloxypropyl
R$^3$=-L-R$^4$, wherein,
L is a single bond, a divalent C1 to C8-alkylene groups, which can be interrupted by one or more O, — or N—C(O)—, and/or —NR$^9$— moieties, and substituted by one or more OH groups,
R$^4$=which is selected from the group of R$^1$, R$^2$, R$^{22}$, hydrogen,
(R$^1$X)$_x$R$^1_{3-x}$Si—, wherein x=1-3, X=C1-C8 alkoxy, C1-C8-alkylcarboxy, C1-C8-alkylamino,
and an ionic group derived from esters of carboxylic acids, S or P acids such as R$^9$—C(O)—O—, (R$^9$—O)$_2$—P(O)—O—, (R$^9$—O)$_2$—P(O)—, (R$^9$—O)$_2$—P—O—, —NHR$^9$—CH$_2$—COOH, —NHR$^9$—CH$_2$—O—S(O)$_2$(OH), —S—S(O)$_2$(OH)$_2$, wherein R$^9$ is =hydrogen, C1-C8 alkyl, C2-C8 alkenyl, me$_3$Si—,
and acid salts of amines, phosphines or preferably salts having quaternary —N$^+$R$_3$ or —P$^+$R$_3$ groups, and R$^{44}$ selected from R$^{42}$ cyclohexyl, norbornyl, phenyl, phenylpropyl, phenylethyl, substituted hydroxyphenyl, eugenol, cumylphenolether, bisphenolethers, naphthyl, C5-C12-thiophene, C8-C12-indol, C12-C22-carbazol, C4-C12-dioxolane, C5-C12-thiophene, C3-C12-1,3-dithiolane, C3-C12-1,3,5-trithiane, C4-C2-1,3-dithiane, C5-C12-tetra hydro-2H-thiopyran, C6-C12-epoxyalkyl, C6-C22-epoxycycloalkyl, optionally substituted or interrupted by R$^1$, OH, Cl, F, —NR$^9$—, —O— —S— atoms, substituted with —OR$^9$,
and
R$^6_x$R$^1_{3-x}$Si—, wherein x=1-3,
R$^6$=C6-C10-aryl, C7-C12-arylalkyl, C6-C12-cycloalkyl, C7-C16-bicycloalkyl, epoxy C3-C12-epoxy alkyl, C6-C12-cycloalkyl, epoxy C7-C16-bicycloalkyl, C6-C12-thiocycloalkyl, C5-C12-hetero N, O, S-aryl, bonded via L to the silicon atom of the siloxy unit, whereby at least one component (B) comprises more than 10 mol. % siloxy units which are substituted with R$^{22}$ and R$^{42}$.

The group R$^4$ or R$^{4*}$ can also be selected from an ionic group. These ionic groups R$^4$ can be synthesized on different routes.

One of the exemplary ionic groups is derived from alkylation reaction, i.e., hereby an alkylhalogenide or halogenalkylene group is reacted with an amine or phosphine to result ammonium groups either hydrogen addition acid salts or preferably quaternary —N$^+$R$_3$ or —P$^+$R$_3$ groups.

Another synthesis route can start with epoxy groups which are reacted with amines, phosphines, carboxylic acid or inorganic acids or half esters of P or S based acids.

In that embodiment an oxiranyl group is used as alkylation agent and is reacted with a primary, secondary or tertiary amine to form a ring opened hydroxyl amine or ammonium unit as group R$^4$.

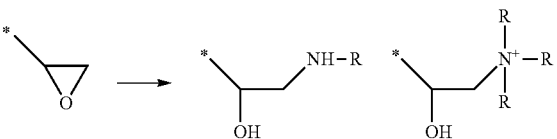

In another example, the oxiranyl group is reacted with a carboxylic acid or any other acid, e.g. a methacrylic acid, a phosphoric acid, etc. to form ester groups inserting a new R group, which preferably an unsaturated group R$^2$.

Such a reaction allows changing the character of R$^4$ group into a R$^2$ group.

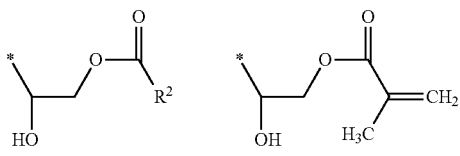

In one exemplary embodiment, the composition of the invention comprises at least one of the polyorganosiloxanes (B) which is selected from the group of formula $M^{R3}$-$D^{R1}_u$-$D^{R2}_v$-$D^{R3}_w$-$M^{R3}$ whereby $R^1$=methyl, 3,3,3-trifluoropropyl
u=0 to 100
v=0-10
w=1 to 100 and
$R^2$ is selected from vinyl, allyl, hexenyl, octenyl, $R^{22}$ selected from cyclohexenylethyl, limonyl, norbornenylethyl, vinylphenylethyl, C2-C8-alkenylphenylether, C2-C8-alkenylbiphenylether, allyloxyphenyloxypropyl $R^3$=-L-$R^4$,
and L is defined above
$R^4$ is selected from the group of $(R^1X)_xR^1_{3-x}Si$, wherein x=1-3, X=C1-C8 alkoxy, C1-C8-alkylcarboxy, C1-C8-alkylamino,
and an ionic group derived from esters of carboxylic acids, S or P acids such as $R^9$—C(O)—O—, $(R^9$—O$)_2$—P(O)—O—, $(R^9$—O$)_2$—P(O)—, $(R^9$—O$)_2$—P—O—, —NHR$^9$—CH$_2$—COOH, —NHR$^9$—CH$_2$—O—S(O)$_2$(OH), —S—S(O)$_2$(OH)$_2$, quaternary —N$^+$R$^9_3$,
and
$R^{42}$=cyclohexylethyl, norbornyl, norbornylethyl, phenyl, phenylethyl, phenylpropyl, naphthyl, eugenol, bisphenolethers, cumylphenolether, glycidylpropylether, epoxylimonyl, epoxycyclohexanethyl, epoxynorbornyl, 1,3-dithiolane, 1,3,5-trithiane, 1,3-dithiane, thiophenyl tetrahydro-2H-thiopyranyl, carbazol, indol, trisphenylsilyl, and
$R^6$me$_2$Si—, wherein $R^6$=C6-C10-aryl, C7-C12-arylalkyl, C6-C12-cycloalkyl, C7-C16-bicycloalkyl, C6-C12-cyclothioalkyl, C5-C12-hetero-N, —O, —S-aryl, optionally substituted by $R^1$, OH, Cl, and a silyl ether group $R^1_3$Si—O—,
and of unsubstituted or substituted oxyphenyl moieties, whereby the group

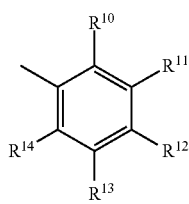

is substituted with $R^{10}$ to $R^{14}$,
wherein $R^{10}$, $R^{14}$ is hydrogen or $R^1$ and $R^{11}$, $R^{12}$, $R^{13}$ are selected from —OR$^9$,
Whereby at least one of the groups $R^{11}$ to $R^{13}$ is a OH group,
bonded via L to the silicon atom of the siloxy unit,
whereby at least one component (B) comprises more than 10 mol. % siloxy units which are substituted with $R^{22}$ and $R^{42}$.

The composition of the invention comprises at least one polyorganosiloxanes (B) with a very specific structure of the polyorganosiloxane (B) which provides the best performance in the stabilization of the component (A) the metal oxide/hydroxide. This polyorganosiloxane (B) has the structure selected from the group of the formulas (IIIa), (IIIb), and (IVa)

M-$D^{R1}_u$-$D^{R2}_v$-$D^{R3}_w$-M* (IIIa)

$R^4$-{-L[SiR$_2$O]$_p$—SiR$^2$}$_m$-L-$R^{4*}$ (IIIb)

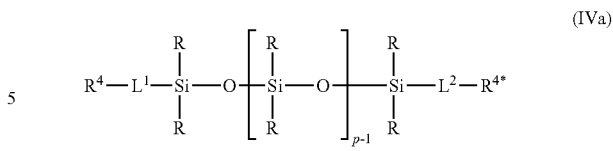

R, R* can be different and are selected form the group which consists of $R^1$, $R^2$, $R^{22}$, $R^3$, $R^4$, $R^{42}$ as defined above, wherein the terminal groups $R^4$ and $R^{4*}$ are selected from $R^4$ and $R^{42}$ defined above but are different to each other,
p=1 or 4 or 9
$R^1$=methyl,
$R^3$=-L-$R^4$
whereby L is selected from L1 and L2 are divalent C1 to C8-alkylene groups, which can be interrupted by one or more O, — or N—C(O)—, and/or —NR$^9$— moieties, and substituted by one or more OH groups,
$R^2$ is selected from the group which consists of vinyl, hexenyl, octenyl, $R^{22}$=limonyl, cylclohexenylethyl, vinylphenylethyl, C2-C8-alkenylphenylether, C2-C8-alkenylbiphenylether allyloxyphenyloxypropyl,
$R^4$ is and $(R^1X)_xR^1_{3-x}Si$—, wherein x=1-3, X=C1-C8 alkoxy, C1-C8-alkylcarboxy, C1-C8-alkylamino, and
selected from the group $R^{42}$ which consists of $R^{22}$, phenyl, phenylethyl, phenylpropyl, naphthyl, eugenol, bisphenolethers, cumylphenolether, norbornyl, glycidylpropylether, cyclohexenoxide ethyl, limonyloxide, norbornyloxide, 1,3-dithiandimethylsilyl, trisphenylsilyl, $R^6$me$_2$Si—, wherein $R^6$=phenylethyl, phenylpropyl, eugenol, limonyl, epoxylimonyl, glycidylpropylether epoxycyclohexylethyl, norbornenylethyl, epoxy norbornenylethyl, carbazol, indol, and of unsubstituted or substituted oxyphenyl moieties, whereby the group

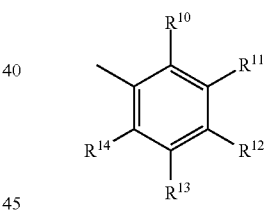

is substituted with $R^{10}$ to $R^{14}$,
wherein RE), $R^{14}$ is hydrogen or $R^1$ and $R^{11}$, $R^{12}$, $R^{13}$ are selected from —OR$^9$,
wherein at least two of the groups $R^{11}$ to $R^{13}$ are an OH group, bonded via L to the silicon atom of the siloxy unit, whereby at least one component (B) comprises more than 10 mol. % siloxy units which are substituted with $R^{22}$ and $R^{42}$.

The asymmetrically substituted polyorganosiloxane (B) comprises two different terminal groups. Such polyorganosiloxanes (B) having two different terminal substituents are synthesized stepwise by at least a in two step process.

Both reactions steps include preferably a hydrosilylation reaction, whereby either unsaturated compounds or compounds comprising SiH groups providing the group $R^4$ or $R^{42}$ which are reacted with alpha, omega functional organodi-, organopenta- or organodecasiloxanes providing the complementary group for a hydrosilylation addition reaction.

In embodiments, it is desirable to use pentaorganosiloxanes as precursor. Such organopentasiloxanes having exactly five siloxy units in an amount of more than 85 wt.

% are reaction products of a non-equilibrating ring-opening reaction of hexaorganotrisiloxane (JP 11-158188 A). These precursors can be synthesized in very high purity. These polyorganosiloxanes are therefore called monomodal polyorganosiloxanes due to its uniform narrow distribution of chain lengths.

Based on these specific uniform polyorganosiloxane as precursors having a small index of the polydispersity, i.e., weight-average molecular weight to the number-average molecular weight Mw/Mn is in the range 1 to 1.2, the new asymmetric polyorganosiloxanes were synthesized which are suitable for the purpose of the invention. The organodi- and organopenta- or decsiloxane precursors can be purified e.g. by distillation up to a content of more than 90 wt. %. The inventors found a way to insert the different terminal groups stepwise, whereby after each reaction step a purification step could be applied, which allows to control the completeness of the addition of the first terminal end group and then the addition of a second different terminal group.

These precursors can be submitted immediately to addition reaction with compounds providing the group $R^4$ or submitted to chain extension reaction. The chain extension is another option in which more than one polyorganosiloxane showing to more than 85 wt. % only one chain length are linked to each other by the group L. Hereby the monomodal organodisiloxane, organopentasiloxane or organodecasiloxane, which are symmetrically substituted with reactive groups, are reacted with two other monomodal siloxane blocks and then after purification with the next two blocks in order to synthesize a block polymer with distinct well defined monomodal polysiloxane blocks.

For example, applying the reaction steps a1) first compound $Z^*$-L-$[SiR_2O]_p$ $SiR_2$-L-$Z^*$ with 2 mols of a α,ω-terminated polyorganosiloxane of the formula $Z^{}$-L-$[SiR_2O]_p$ $SiR_2$-L-$Z^{}$ $Z^*$ is selected from SiH-silane or siloxane, alkenyl, Cl-alkyl or Br-alkyl, epoxy, amine, —NCO $Z^{**}$ selected from $Z^*$ which can complementarily react with each other optionally in the presence of a catalyst, wherein p=1 or 4 or 9, R, L=L1, L2 or L* are defined above, whereby $Z^*$ and $Z^{}$ in step a1) are forming a unit -$L^3$-, $Z^{}$-L$[SiR_2O]_p$ $SiR_2$-$L^3$-$[SiR_2O]_p$—$SiR_2$-$L^3$-$[SiR_2O]_p$ $SiR_2$L-$Z^{}$, wherein $Z^{}$ is $R^2$, $R^{22}$, $R^4$, $R^{4*}$, $R^{42}$, $R^{42*}$.

In the final step, the precursors carrying the groups $Z^*$ and $Z^{**}$=$R^4$ or $R^{4*}$ are with a $Z^*$ group of the intermediate to form another L group in order complete the final polyorganosiloxane (B) which is asymmetrically substituted at the terminal groups $Z^{**}$=$R^4$, $R^{42}$ or $R^{4*}$, $R^{42*}$.

The preferred precursors for the asymmetrically substituted polyorganosiloaxane (B) are organodi-, organopentasiloxane and organodecasiloxane either with alpha, omega dihydrogen or alpha, omega di-alkenyl substituents.

In a first embodiment of the synthesis for the asymmetrically substituted polyorganosilxoane (B) an alkenyl compound forming after reaction $R^4$ is added to the starting precursor of Formula (IVb)

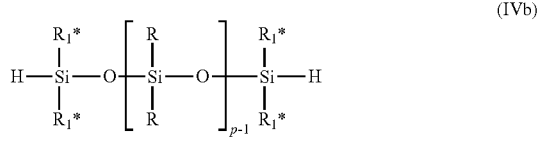

(IVb)

whereby a first unsaturated compound providing the group $R^4$ or $R^{42}$ and a different second unsaturated compound providing the group $R^{4*}$ or $R^{42*}$ is added to that alpha, omega-dihydrogendisiloxane, -pentasiloxane or -decasiloxane.

For example without being exhaustive it is preferred to use the following pentasiloxanes as precursor for the asymmetrically substituted polyorganosiloxanes of the invention.

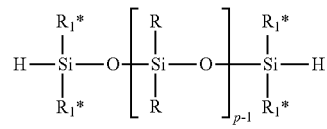

$R_1^*$=methyl, phenyl, 3,3,3-trifluoropropyl

R selected from $R_1$=methyl, $R^4$=phenyl, styryl, phenylpropyl, etc.

p=1 or 4 or 9.

For example in such first addition reaction the alkenyl precursor may be an alkoxysilane of the formula $(R^1O)_xR^1_{3-x}Si$—CH=$CH_2$ to form a group $R^4$, x=1-3 to form $(R^1O)_xR^1_{3-x}Si$—$CH_2CH_2$—$SiR_2$—O-$[D]_{p-1}$-$SiR_2$—H.

The reaction is catalyzed with usual hydrosilylation catalysts, such as, e.g., a Pt-Karstedt catalyst or other suitable Pt catalysts.

The intermediate product after the first addition reaction must be purified by an appropriate way to obtain an organodisiloxane, a organopentasiloxane or a organodecasiloxane with two different groups $R^4$ or $R^{4*}$ after the second addition reaction.

By a more detail description the reaction is carried out in a way whereby a molar excess of the SiH functionalized organodi- or pentasiloxane is reacted with an unsaturated silane, e.g., having the structure $(R^1O)_xR^1_{3-x}Si$—CH=$CH_2$ wherein x is 1-3 in the presence of a hydrosilylation catalyst. Typically, the excess of the SiH precursor according to formula (IVc) can be removed by distillation.

In a second hydrosilylation step the intermediate of the formula

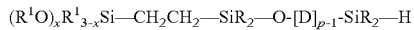

$(R^1O)_xR^1_{3-x}Si$—$CH_2CH_2$—$SiR_2$—O-$[D]_{p-1}$-$SiR_2$—H having the desired first reactive group $R^4$, i.e. the alkoxysilyl group, is reacted with a second compound comprising at least one unsaturated group to yield the desired final asymmetric polyorganosiloxane. Examples of suitable groups for the second addition reaction include, but are not limited to this enumeration, bis-olefenic compounds, 1,5-hexadiene, norbornadiene, 5-ethylidene-2-norborene, limonene, exo-dicyclopentadiene, ethylene glycol diallyl ether, propylene glycol diallyl ether, divinyl-tetramethyldisiloxane, divinylbenzene, diallylphenyl ether, trisphenylvinylsilane, N-vinylcarbazol, etc.; acetylenic-olefinic, e.g., propargylic alcoholundecylenic acid ester, etc., acetylenic-bis-olefinic, etc.; 1,4-butynediole-bis(undecylenic acid) ester, and bis-acetylenic, e.g., bis-propargyl ether In a second embodiment of the synthesis of the asymmetrically substituted polyorganosilxane (B) a complementary synthesis route is starting with an alpha, omega-dialkenyl di-, pentasiloxane or decasiloxane.

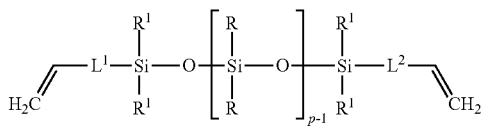

(IVc)

$R^1$=methyl, phenyl,

R selected from $R^1$=methyl, $R^4$=phenyl, styryl, phenyl-propyl, etc.

p=1 or 4 or 9.

whereby a first and a second compound providing the group $R^4$ having a SiH group is added stepwise to that alpha, omega-dialkenyl di-, pentasiloxane or decasiloxane to obtain a di-, organopentasiloxane or organodecasiloxane which has two different terminal groups $R^4$ respectively $R^{42}$.

For example a preferred suitable route for the incorporation of alkoxysilyl groups and olefinic groups into the polyorganosiloxane compound is the addition of alkoxysilanes of the structure $(R^1O)_xR^1_{3-x}Si$—H to form a group $R^4$, wherein x is 1-3, in an amount of less than 1 mol/1 mol dialkenylpentasiloxane of formula (IVc) in the presence of a hydrosilylation catalyst yielding the target derivatives of the structure $(R^1O)_xR^1_{3-x}Si$—$CH_2CH_2$—$SiR_2$—O-$[D]_{p-1}$-$SiR_2$-L-CH=$CH_2$.

Typically, the excess of the dialkenyl di- or pentaorganosiloxanes can be removed by distillation. This product can already be used as such as asymmetrical polyorganosiloxane (B), if the second assumption for the inventive component (B) is fulfilled, i.e. some of the groups R must be chosen from optical dense substituents $R^{22}$ or $R^{42}$ and a sufficient concentration of these substituents in order to obtain a refractive index $n_D^{20}$ of more than 1.43.

In a further reaction step a SiH group providing a different group $R^4$ can be added.

Such a precursor moiety can again also be another di or organopentasiloxane in order to enlarge the number of siloxane blocks.

For example the precursor of the formula $(R^1O)_xR^1_{3-x}Si$—$CH_2CH_2$—$SiR_2$—O-$[D]_{p-1}$-$SiR_2$-L-CH=$CH_2$ is e.g. can be further reacted with a silane or a siloxane compounds comprising L*-$R^4$ having in addition one SiH-group and a second reactive group $R^4$ which e.g. is an epoxy group and be counted as $R^{42}$, for example of formula (IVe),

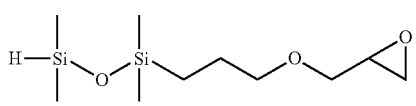

(IVe)

in the presence of a hydrosilylation catalyst.

It is in the scope of the invention to change the order of the addition steps for the compounds comprising -L*-$R^4$. For example, it is possible to react the divinyl-di- or -pentaorganosiloxane compound with the compound of the type SiH-epoxysiloxane first and then afterwards with a silane of the structure $(R^1O)_xR^1_{3-x}Si$—H wherein x is 1-3.

Particularly suitable structures of the polyorganosiloxane (B) are linear polyorganosiloxanes which are substituted with different terminal groups $R^4$ or $R^{42}$ and $R^{4*}$ or $R^{42*}$ selected from $R^4$.

The siloxane block has either 2, 5 or 10 siloxy units. Polyorganosiloxanes with pentasiloxane units are particularly suitable in the inventive compositions.

Such polyorganosiloxanes (B) used in the inventive composition are defined as follows:

The polyorganosiloxane (B) is selected from the formula $M^{R3}$-$D^{R1}_u$-$D^{R3}_w$-$M^{R3*}$ wherein $R^3$, $R^{3*}$ are L-$R^4$ or L-$R^{4*}$ and the groups $R^4$ and $R^{4*}$ selected from $R^4$ and $R^{42}$ and are different to each other and whereby the polyorganosiloxane (B) is selected from group of the structural formulas

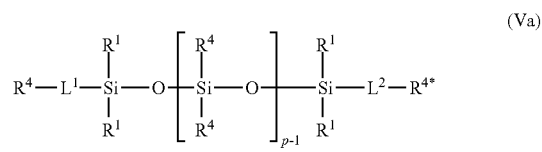

(Va)

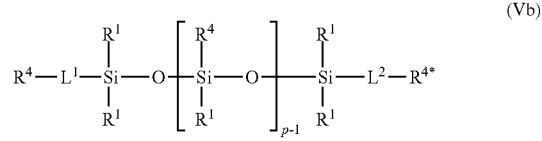

(Vb)

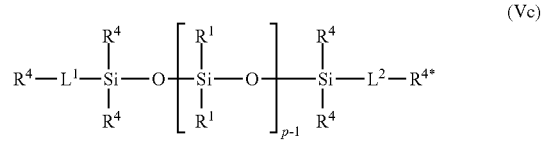

(Vc)

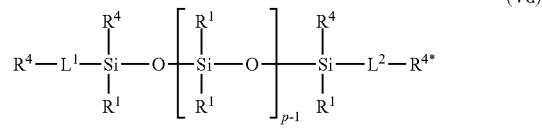

(Vd)

$R^1$=methyl, $R^4$ and $R^{4*}$ as defined above, p=1, 4 or 9, preferably 4

$L^1$ and $L^2$ are selected from the group L as defined above, whereby $L^1$ and $L^2$ are divalent C1 to C8-alkylene groups, which can be interrupted by one or more O, — or N—C(O)—, and/or —$NR^9$— moieties, and substituted by one or more OH groups, characterized in that (B) comprises more than 10 mol. % siloxy units which are substituted with groups selected from $R^{22}$ and $R^{42}$.

In one embodiment, when $R^4$ is $(R^1X)_xR^1_{3-x}Si$ then $R^{4*}$ is chosen from —$(C_2H_4O)_{1-6}$ $(C_3H_6O)_{1-6}$—$R^3$ or; —$(C_2H_4O)_{1-20}(C_3H_6O)_{1-6}$—OH; —$(C_2H_4O)_{1-20}(C_3H_6O)_{1-6}$—O—C1-C4 alkyl; —$(C_2H_4O)_{1-20}(C_3H_6O)_{1-6}$—O—C(O)—C1-C4 alkyl.

In an exemplary embodiment the asymmetric siloxane comprises more than 95 wt. % of a pentasiloxane or decasiloxane block showing only traces of siloxanes having less and more siloxane units than 5 or 10, so to say a monomodule chain distribution of Mw/Mn<1.1. In another exemplary embodiment, the more pentasiloxane units are linked together via a sequence of small siloxane block units linked by a L3 unit having either 2 or 5 or 5+2+5 siloxane units, whereby all siloxane units are discrete molecules without chain length distribution.

In one exemplary embodiment of the composition, it contains at least one of the exemplary polyorganosiloxanes (B) suitable for making stable compositions according to the inventive. This polyorganosiloxane (B) is selected from the polyorganosiloxanes of the structure of formulas (VIa) to (VIf), wherein R and R* are selected from $R^1$ and $R^4$ whereby R and R* can be different

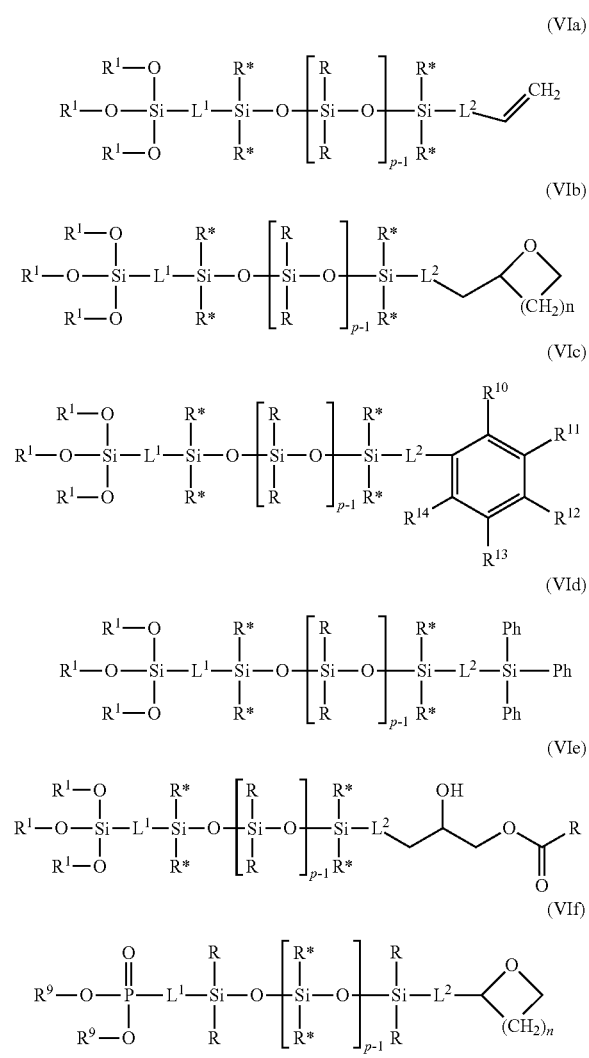

R,R*=methyl, 3,3,3-fluoropropyl, $R^4$, $R^{42}$,
p=1 or 4 or 9
n=0-6
$R^2$ is selected from the group which consists of vinyl, hexenyl $R^{22}$=limonyl, cyclohexenylethyl, norbornenylethyl, vinylphenylethyl, C2-C8-alkenylphenylether, C2-C8-alkenylbiphenylether, allyloxyphenyloxypropyl $R^3$=-L-$R^4$ wherein L is selected from L1 and L2 are divalent C1 to C8-alkylene groups, which can be interrupted by one or more O, — or N—C(O)—, and/or —$NR^9$— moieties, and substituted by one or more OH groups, $R^4$ is and $(R^1X)_xR^1_{3-x}Si$—, wherein x=1-3, X=C1-C8 alkoxy, C1-C8-alkylcarboxy, C1-C8-alkylamino, and selected from the group $R^{42}$ which consists of phenyl, phenylethyl, phenylpropyl, naphthyl, eugenol, bisphenoletherher, cumylphenolether, $R^{22}$ which consists of norbornyl, glycidylpropylether, cyclohexenoxide ethyl, limonyloxide, norbornyloxide, 1,3-dithiandimethylsilyl, trisphenylsilyl, $R^6me_2Si$—, wherein $R^6$=phenylethyl, phenylpropyl, eugenol, limonyl, epoxyliomonyl, glycidylpropylether epoxycyclohexylethyl, norbornenylethyl, epoxy norbornenylethyl, carbazol, indol, of unsubstituted or substituted oxyphenyl moieties, whereby the group is

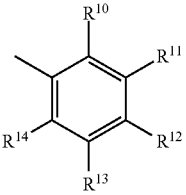

substituted with $R^{10}$ to $R^{14}$, wherein $R^{10}$, $R^{14}$ is hydrogen or $R^1$ and $R^{11}$, $R^{12}$, $R^{13}$ are selected from O—$R^9$, whereby at least two of the groups $R^{11}$ to $R^{13}$ are OH, bonded via L to the silicon atom of the siloxy unit, whereby at least one component (B) comprises more than 10 mol. % siloxy units which are substituted with $R^{22}$ and $R^{42}$.

These short chain polyorganosiloxanes provide in particular the ability to stabilize the metal oxide/hydroxide particles, since these polyorganosiloxanes have at least one functional terminal group which has the tendency to interact with the filler surface of the metal oxide/hydroxide particles and can adhere the polyorganosiloxane (B) to surface of the filler.

The second terminal group is more or less inert towards the filler surface or has a weaker interaction to the filler surface and can support shielding and separation of the particles from each other and block agglomeration. This second substituent $R^4$ can be selected from reactive groups $R^4$, which in addition if desired can undergo crosslinking reactions with other reactive groups $R^2$, $R^4$ or $R^2$. The group $R^4$ can be selected also from the group $R^{42}$. The group $R^{42}$ provides in addition a higher optical density, i.e. is showing a higher refractive index not only as precursor but also when linked to the siloxane and is therefore is useful for making high refractive polyorganosiloxane in particular high refractive polyorganosiloxanes according to the invention.

In one embodiment of the invention the composition comprises therefore at least two polyorganosiloxanes (B) wherein one is a polyorganosiloxane (B) asymmetrically substituted by the terminal groups $R^3$ and $R^{3*}$ respectively L-$R^4$ and L-$R^{4*}$, whereby the two substitutents $R^3$ and $R^{3*}$ at terminal ends are different.

In one exemplary embodiment of the invention, the composition comprises further at least a third polyorganosiloxanes (B2) which has an additional group $R^2$, whereby $R^2$ is hydrogen in SiH group and can serve as crosslinker component (C).

In an exemplary embodiment, the asymmetric siloxane provides at least one group which can undergo curing reaction at least towards an additional polymer moiety used as binder or matrix polymer for the metal oxide/hydroxide filler (A) and a second group which can undergo interaction or reaction with the metal oxide/hydroxide component (A).

In one aspect of the invention, the present subject matter provides a silicone composition comprising:
(a) at least one curable or uncurable polyorganosiloxane (B) comprising an polyorganosiloxane (B) asymmetrically substituted at the terminal siloxy groups used as binder matrix and (or dispersing polymer, and
(b) the metal oxide particles (A) of the invention.

A preferred asymmetric polyorganosiloxane (B) is selected from siloxanes having at least one siloxane block with narrow distribution of the molecular weight, e.g. one siloxane block comprising more than 95 wt. % of a discrete organodi-, organopentasiloxane or organodecasiloxane.

In one aspect of the invention, the present subject matter provides a method for forming a curable polyorganosiloxane composition comprising reacting a polyorganosiloxane (B) in the presence of a metal oxide/hydroxide particles (A) and a crosslinker component (C) and optionally a catalyst component (D) by a curing reaction which is initiated by a hydrosilylation catalyst and in addition assisted either by heat or light, polycondensation, or radical polymerization or cationic polymerization by related catalysts or initiators.

The crosslinker component (C) can be selected from the group which consists of silanes and siloxanes having reactive groups towards the reactive groups of component (B1) or (B2), whereby these reactive substituents of the crosslinker component (C) are selected from the group which consists of SiH, alkenyl, alkoxy, amino, carboxy, epoxy, and thiol groups. Polyorganosiloxanes (B2) suitable as crosslinker in a hydrosilylation reaction comprise preferably at least two SiH units. The amount of the crosslinker component (C) to be used depends on the concentration of the unsaturated groups $R^2$ or $R^{22}$ in the polyorganosiloxane (B1) and the SiH concentration in (B2). The range of the molar ratio of SiH:$R^2$ or $R^{22}$ in the polyorganosiloxane (B1) can be in the range of about 0.1 to 7:1.

For smaller concentrations of unsaturated groups $R^2$ or $R^{22}$ up to 10 mol. % $R^2$ or $R^{22}$ related to all siloxy units a range of 0.5 to 4:1 is preferred, for higher concentrations of $R^2/R^{22}$, i.e., >10 mol. % of unsaturated groups the SiH: alkenyl $R^2/R^{22}$ ratio is preferably 0.1 to 1:1.

Typical structures for polyorganosiloxanes (B2) suitable as crosslinker are di- or multifunctional SiH siloxanes:

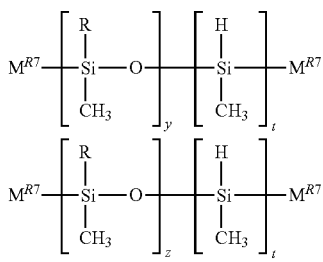

z=u, v, or w
One specific example used in the examples may be M-D$_2$-D$^{Ph}$$_2$D$^H$$_2$-M

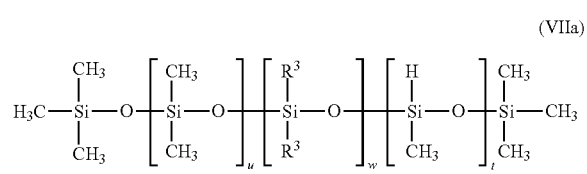

(VIIa)

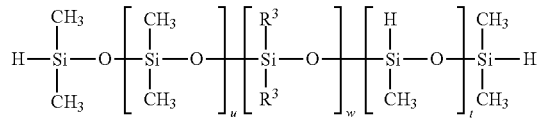

(VIIb)

u=0 to 100, preferably 0 to 10
w=0 to 100, preferably 2 to 10
t=0 to 60, preferably 1 to 10 at least 2 SiH in a formula (VIIb)
$R^3$=L-$R^4$ as defined above, $R^4$ are preferably phenyl, phenylpropyl, eugenol, styryl(phenylethyl), trisphenylsilylethyl, limonyl, norbornylethyl, epoxylimonyl, glycidyloxypropyl, epoxycyclohexylethyl.

The invention includes a composition comprising at least one polyorganosiloxane (B) which comprises 5 mol. % of siloxy groups substituted by the optical dense group $R^{22}$ or $R^3$=-L-$R^{42}$.

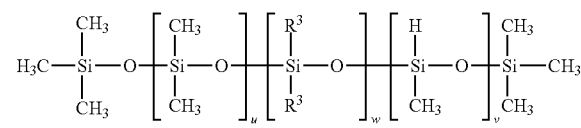

(VIIIa)

one specific example used in the examples may be M-D$_2$-D$^{Ph}$$_2$D$^{vi}$$_2$M

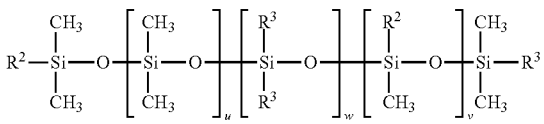

(VIIIb)

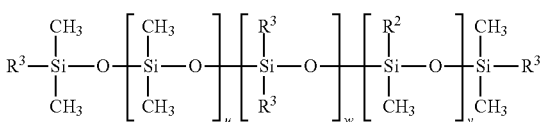

(VIIIc)

u=0 to 500, preferably 0 to 200
w=0 to 400, preferably 2 to 150
v=0 to 20, preferably 1 to 5,
wherein $R^3$ is as defined above, is preferably phenyl, phenylpropyl, eugenol, styryl(phenylethyl), trisphenylsilylethyl, limonyl, norbornylethyl, epoxylimonyl, glycidyloxypropyl, epoxycyclohexylethyl.

In one exemplary composition of the invention at least one polyorganosiloxane (B) comprises more than 20 mol. % of the siloxy groups are substituted with the optical dense groups $R^{22}$ or $R^{42}$.

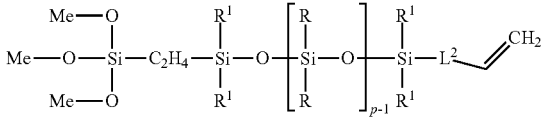

-continued

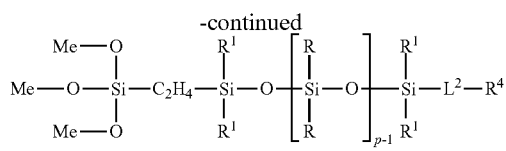

R=R¹ or R³
p=1, 4 or 9
L2=single bond or C1-C22-alkyl, C7-C12-alkylarylene, C7-C12-alkylarylalylene
R⁴ as defined above.

In one preferred embodiment the composition of the invention comprises at least one polyorganosiloxanes (B) which is selected from group of the formula (IIIb)

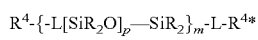

L, R⁴ are is as defined before; R⁴ and R⁴* are selected from R and are different
R is selected from R¹, and R³,
p=1 or 4 or 9
m=1 to 7.

This type of polyorganosiloxanes (B1) is based on asymmetrically substituted precursors for polyorganosiloxanes (B1), whereby the final addition of substituents creating the asymmetrical final polyorganosiloxanes (B1) is preferably a hydrosilylation reaction between a symmetrically substituted alpha, omega SiH— or alkenyl-terminated siloxane composed of a distinct di- or organopentasiloxane or organodecasiloxane blocks and an at the terminal units asymmetrically substituted siloxane with distinct monomodal di- or organopentasiloxane or decasiloxane blocks.

The polyorganosiloxanes (B) in compositions of invention has a viscosity in the range between 10 to 20000 mPa·s at 25° C. at a shear rate of D=10 s⁻¹.

The inventive composition further comprises a crosslinker (C) selected from the group of silanes and siloxanes having reactive groups towards the reactive groups of component (B1) or (B2), whereby these reactive substituents of (C) are selected from the group which consists of SiH, alkenyl, alkoxy, amino, carboxy, epoxy, and thiol groups.

The polyorganosiloxanes (B2) are as defined before. The crosslinker component (C) can also be selected from the group of hydrocarbons without silicon atoms.

In general such crosslinkers are selected from the group which consists of
a) di- or multifunctional silanes $(R^1X)_xR^1_{3-x}Si$—R or siloxanes having a group $(R^1X)_xR^1_{3-x}Si$—, whereby X, R¹, R are defined above, and
b) di- or multifunctional expoxide with or without a silicon atom,
c) di- or multifunctional amine with or without a silicon atom,
d) di- or multifunctional carboxylic acids with or without a silicon atom, and
e) optionally alkenes or alkynes with di- or more unsaturated groups with or without a silicon atom, such as trivinylcyclohexane, esters or ethers having di- or multi unsaturated substituents.

In one embodiment of the compositions, the crosslinkers of (C) are selected from the group which consists of di- or multifunctional silanes of the type $(R^1X)_x R^1_{3-x}Si$—R or siloxanes having such reactive R¹—X groups. These crosslinkers are typically used in so-called Room Temperature Vulcanizing 1 Part (RTV-1K) or 2-Part composition (RTV-2K) rubber. Such compositions are characterized by a cure mechanism, wherein a condensation reaction takes place in the presence of organometal catalyst. Suitable crosslinkers are selected form the group of $R^{15}_b Si(OR^1)_{4-b}$ e.g., alkylalkoxysilane $R^{15}_b Si(OCOR^1)_{4-b}$ e.g., alkylacetoxysilane
$R^{15}_b Si(NR^1_2)_{4-b}$ e.g., alkyl-alkylaminosilane
$R^{15}_b Si(ON=R^1_2)_{4-b}$ e.g., alkyl-alkyloximosilane
$R^{15}_b Si(NHCOR^1_2)_{4-b}$ e.g., alkyl-alkylamido bzw. alkyl-arylamidodsilane,
b=0 to 2 preferably 0 or 1,
the R¹⁵ group are selected from C1-C10 alkyl, alkoxyalkyl, C2-C8 alkenyl or phenyl.

Individual compounds are selected from e.g., tetraethoxysilane, polysilica esters, vinyltrialkoxysilanene, methoxyethyl-trialkoxysilanene, methyltrialkoxysilanen, methyltris-benzamidosilane, methyl-trisactecoxysilane, methyl-tris(trialkylamino)silane methyl-tris(trialkylaminoxy)-silane, methyl-tris(butoximo)silane.

Those polyorganosiloxanes (B) which comprise reactive silyl groups of the type $(R^1X)_xR^1_{3-x}Si$— can be cured by such a mechanism.

The crosslinkers (C) suitable for curing/crosslinking epoxy substituted polyorganosiloxane (B) are any kind of epoxy compounds with and without silicon or SiH silanes or siloxane compounds. If the crosslinker component (C) is selected from silicon-free compounds then small molecules are preferred. The related curing is activated by heat, light, oxygen or humidity, if carried at room temperature it needs longer time to get a complete cure reaction in particular under assistance of humidity.

Component (D)—Catalyst

The composition of the invention optionally comprises the catalyst (D).

The catalyst (D) is selected from an inorganic or an organic peroxide, an azo compound, a hydrosilylation catalyst comprising an organometal compound, wherein the metals are chosen from Pt, Ru, Rh, Co Ni, Fe; and selected from an organometal or metal-free condensation catalyst, wherein the metals are chosen from Sn, Ti, Zr, Zn, Bi, Ce, Mn, Mo, V, Y, Yb, and a non-metal a catalyst selected from amines, phosphates, phosphonates, and selected from a catalyst for the cationic polymerization such as light activatable iodonium, sulfonium salts and wherein the anions are chosen from group V-elements such as pentafluoro phosphate, pentafluoro arsenate, and pentafluoro antimonate.

The related catalysts (D) for the aforementioned condensation reaction are selected from the group of a variety of organometal compounds preferably organo tin, titanium, zinc, iron, bismuth, calcium compounds but one can also use Lewis or Broensted acids or bases.

A preferred class of organometal compounds includes salts like dialklytin oxides, reaction products of dialkyltinoxide with tetraalkoxsilanes, dibutyltindilaurate, stannous octoate, dibutyltin dioctoate, zinc octoate, tetraalkoxy titanates or alkoxy titanium chelates of $C_1$-$C_{10}$ carboxylic residues, etc. Specific examples of such catalysts are set forth and disclosed in column 3, lines 19-54 of U.S. Pat. No. 3,527,659 which is incorporated herein by reference. A particular useful curing catalyst for polyorganosiloxanes (B) having $(R^1X)_xR^1_{3-x}Si$ x=1-3 groups in this invention are quaternary ammonium salts such as benzyltrimethylammonium compounds like acetate, tetraalkylammonium acetate or other see U.S. Pat. No. 3,819,745.

The amount of, e.g., the tin catalyst is in the range of about 0.2 wt. % up to max. 2 wt. % of Sn in related organo metal compounds per polyorganosiloxane (B).

In preferred embodiment of the cure reaction epoxy groups present in the polyorganosiloxane (B) are cured respectively crosslinked by light activation of specific salts used as catalyst (D) to start a cationic polymerization. Such catalyst are onium salts used as photocatalyst (D) are previously described in the literature, e.g. in U.S. Pat. No. 4,977,198 and in U.S. Pat. No. 4,576,999. These photocatalysts (D) are the "onium" salts, of the general formulas:

$R^{16}{}_2I^+$ $MX_n^-$; $R^{16}{}_3Se^+$ $MX_n^-$; $R^{16}{}_3Se^+$ $MX_n^-$, $R^{16}{}_3P^+$ $MX_n^-$; $R^{16}{}_4N^+$ $MX_n^-$; where different radicals represented by $R^{16}$ can be the same or different organic radicals selected from C1-C30 aliphatic hydrocarbons, including aromatic carbocyclic radicals having 2 to 20 carbon atoms which optionally can be substituted.

The complex onium anion is selected from the group $MX_n$, wherein MX is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like. The U.S. Pat. No. 4,421,904 showing examples thereof is incorporated herein as reference.

Other onium catalysts are known in the art, like the borate types of EP 703236 or U.S. Pat. No. 5,866,261 such as $B(C_6F_6)_4^-$ are incorporated by reference as well.

The photocatalysts or initiators may be mono- or multi-substituted mono, bis or trisaryl salts.

The complexed onium cation is selected from the elements of the group VII, VI and V.

Typical compounds are bis-diaryl iodonium salts, such as bis(dodecyl phenyl)iodonium hexafluoroarsenate and bis(dodecyl phenyl) iodonium hexafluoroantimonate, and (4-octyloxyphenyl) (phenyl) iodinium hexafluoroantimonate are especially preferred within the MX types as catalyst see also U.S. Pat. No. 4,421,904. These salts are the most preferred in practicing light induced curing of epoxysiloxanes.

In such systems sensitizers like isopropyl-thioxanthone sensitizer can also be present at a concentration of up to 15 mol. % of the iodonium salt disclosed in U.S. Pat. No. 4,279,717.

The second group of catalysts (D) includes compounds selected from the group of free-radical photoinitiators, benzophenones and derivatives thereof, benzoin ethers, alpha-acyloxime esters, acetophenone and camphorquinone, derivatives, benzil ketals, ketone amine derivatives. Preferred examples of these photoinitiators include ethyl benzoin ether, isopropyl benzoin ether, dimethoxy-phenyl acetophenone and diethoxy acetophenone.

UV-curable compositions comprising epoxy but especially acrylic-functional silicone compounds can be made also by combining acrylic-functional silicones with unsaturated ester groups such as (VIe) with a catalytic amount of a free-radical-type photoinitiator which will effectively initiate crosslinking of the acrylic groups contained in the composition.

Brand names of such initiators are e.g. Darocure®.1173 (E. M. Chemicals) Irgacure 651 photoinitiator, a benzoin ether type free radical initiator available from Ciba-Geigy. The photoinitiators are generally used at a concentration of from about 0.1 wt. % to about 5 wt. % by weight related to the total weight of the coating composition (A) to (D).

The third group of catalysts (D) include selected from the group of thermo- or photo activatable radical initiating peroxy or azogroup containing compounds. Preferred photoinitiators are disclosed by Edwards U.S. Pat. No. 3,211,795, Hatanaka, U.S. Pat. No. 4,451,634 and Eckberg U.S. Pat. No. 4,558,147, hereby incorporated by reference. Briefly, Eckberg disclosed certain perbenzoate esters having the general formula: $R^{18}$—O—O—CO—$C_6H_5$—$R^{19}$ wherein $R^{18}$ is a monovalent alkyl or aryl group and $R^{19}$ is hydrogen, alkyl, halogen, nitro, amino, or amido. Preferred perbenzoate esters include t-butylperbenzoate and its para-substituted derivatives, t-butyl-per-p-nitrobenzoate, t-butylper-p-methoxybenzoate, t-butylperoxy-p-methylbenzoate and t-butylperoxy-p-chlorobenzoate. In addition to t-butyl-perbenzoate and its derivatives as photo-initiators can also be suitable. Peroxides can also be heat-activated and depending on the type of peroxide oxygen must be excluded somehow from the composition to be cured.

The amount of photoinitiator employed is not critical and is at least 0.5 part by weight, and it can be anywhere from about 0.5 to about 10 parts by weight based on 100 parts by weight of polyorganosiloxane (B).

As disclosed in U.S. Pat. No. 4,882,201, the radiation-initiated cure of epoxysilicone films can be achieved by the use of UV-lamps such as: mercury arc lamps, Xenon arc lamps, high intensity halogen tungsten arc lamps, microwave driven arc lamps and lasers. The film or coated substrate is exposed to ultraviolet lamps, e.g. of about 200 Watts/inch. A clear, glossy layer can be obtained by curing in less than 1 second.

For crosslinkers of the SiH type the polyorganosiloxane (B2) group which make use of a hydrosilylation reaction the related hydrosilylation catalysts (D) are selected from the group of organo metal compounds, salts or metals, wherein the metal is selected from the group of Ni, Ir, Rh, Ru, Os, Pd and Pt compounds as taught in U.S. Pat. Nos. 3,159,601; 3,159,662; 3,419,593; 3,715,334; 3,775,452 and 3,814,730.

A preferred group of metal compounds are platinum compounds.

The catalyst (D) includes preferably complexes with sigma- and pi-bonded carbon ligands as well as ligands with S—, N, or P atoms, metal colloids or salts of the afore mentioned metals.

Preferred complexes are Pt-(0)-alkenyl complexes, such alkenyl, cycloalkenyl, alkenylsiloxane such vinylsiloxane, because of its easy dispersibility in polyorganosiloxane compositions.

A particularly useful form of the platinum complexes are the $Pt^{(O)}$-complexes with aliphatically unsaturated organosilicon compound such as 1,3-divinyltetramethyldisiloxane (Vinyl-M2 or Karstedt catalyst), as disclosed by U.S. Pat. No. 3,419,593 incorporated herein by reference are especially preferred, cyclohexene-Pt, cyclooctadien-Pt and tetravinyltetramethyl-tetracyclosiloxane (vinyl-D4).

The amount of platinum as metal to be applied is preferably from 1 to 500 ppm, preferably 2 to 100 ppm, especially preferred 2 to 60 ppm, most preferred 2 to 15 ppm by weight of platinum per weight of the polyorganosiloxane component (B).

The hydrosilylation catalyst are preferably selected from the group of catalysts capable of being photoactivated.

These photo-activatable catalysts preferably contain at least one metal selected from the group composed of Pt, Pd, Rh, Co, Ni, Ir or Ru. The catalysts capable of being photoactivated preferably comprise platinum compounds.

Catalyst capable of being photo-activatable is preferably selected among organometallic compounds having ligands which, are preferably selected from sigma bonded alkyl or aryl groups, such as trisorganosilylalkyl groups, sigma-bonded silyl groups, like trialkyl silyl groups. Most preferred photo-activatable catalysts include $\eta^5$-(optionally substituted)-cyclopentadienyl platinum complex compounds having sigma-bonded ligands, preferably sigma-bonded alkyl ligands, and also diketonates.

Further catalysts capable of being photoactivated include (η-diolefin)-(sigma-aryl)-platinum complexes (see e.g. U.S. Pat. No. 4,530,879).

Other examples of catalysts capable of being photo-activated include η-diolefin-σ-aryl-platinum complexes, such as disclosed in U.S. Pat. No. 4,530,879, EP 122008, EP 146307 (corresponding to U.S. Pat. No. 4,510,094 or US 2003/0199603, and U.S. Pat. No. 4,640,939.

The most preferred catalysts capable of being photo-activated to be used in the process of the invention are ($\eta^5$-cyclopentadienyl)-trimethyl-platinum, ($\eta^5$-cyclopentadienyl)-triphenyl-platinum complexes, in particular, ($\eta^5$-methylcyclopentadienyl)-trimethyl-platinum.

The related crosslinkers for the hydrosilylation reaction of these catalysts are defined above under component (B2).

This curing process is preferred since it provides high curing rates even for thick sections of >1 to 50 mm and more whereby the curing temperature can be kept at temperatures below 50° C.

Such curing temperatures are in particular necessary if the optical materials made out the composition of the invention are combined with temperature sensitive other electronic or optical materials.

The composition of the invention can in addition comprise an auxiliary component (E) for the adjustment of the processability. The component (E) is preferably selected from the group of organic and inorganic solvents or levelling agents, such as solvents having a boiling point below 250° C. at 1033 mbar. Example of such additives or solvents are in particular polyorganosiloxanes with 2 to 6 siloxy groups such as $(me_3Si)_2O$, $(me_2SiO)_{3-6}$, $me_3SiO\text{-}(me_2SiO)_{1-4}\text{-}Sime3$, benzene, toluene, xylene, C1-C8 alkyl alcohols, solvents usual for the coating industry.

One of the main ingredient of the inventive composition is the metal in the metal oxide/hydroxide component (A) which is selected from the group which consists of Ti, Zr, Hf, Sn, Ce, Al, As, In, Zn, Ge, Sb, Cr, Cd, W, Mo and Nb.

Such metal oxide/hydroxide nano particles are e.g. disclosed in WO 2012/058271 A2 and WO 2011/133228 A2. Nano particle suitable for optical application in compositions of high transparency and refractive index must provide particles below the wavelength of visible light. Therefore the particle size is preferably below 200 nm for the longest dimension of a diameter. In addition the maximum of possible refractive of any of the species needs to use particles which comprise at least to some extent crystalline compartments.

The component (A) can comprise more than one metal oxide/hydroxide i.e. mixed metal oxides containing a combination of two or more metallic elements in the same particle, or a mixture of two or more oxide particles. The metal oxide particles can have a particle size of approximately 100 nm or less; approximately 50 nm or less; approximately 25 nm or less; approximately 10 nm or less; even approximately 5 nm or less. In one embodiment, the metal-oxide particles have a particles size of from about 0.5 nm to about 100 nm; from about 1 nm to about 75 nm; from about 2 nm to about 50 nm; from about 5 nm to about 25 nm; even from about 7.5 nm to about 10 nm.

The metal oxide/hydroxide component (A) of this invention is composed of very narrowly distributed particle sizes between 2-7 nm. Such particles sizes can be determined by measuring the average particle size $D_{50}$ in particular, determined by laser Dynamic Light Scattering with a Malvern Zetasizer, a method which is also known as photon correlation spectroscopy or quasi-elastic light scattering following ISO 13320-1 (see also http://en.wikipedia.org/wiki/Dynamic light_scattering). Although this method is the determination method of choice, in particular in a non-cured composition, in certain instances it is also sufficient to determine the average particle size $D_{50}$ by electron microscopy (TEM).

The composition of the invention therefore comprises the metal oxide/hydroxide component (A) in a form which has a crystalline structure showing XRD reflexes and particles with a length in the range of less than 200 nm, preferably less than 100 nm, more preferably less than 20 nm. The term XRD reflexes means discretely scatters X-ray reflexes as shown e.g., in WO 2011/133228 A2. It is believed that the presence of at least some areas of crystalline structures is an assumption for a higher refractive index as desired. It has been found that any of the known disclosed surface treatments for blocking the agglomeration or sedimentation of the nano metal oxides in polysiloxanes is not sufficient, but could be overcome the polyorganosiloxanes (B) of the invention.

The composition of the invention contains higher concentrations of the high refractive metal oxide/hydroxide component (A). Since such nano fillers have the tendency to increase the viscosity up to a level which antagonizes a good processability it is preferred that the composition comprising the components (A) to (E) has a viscosity in the range of between 100 to 50000000 mPa·s at 25° C. at a shear rate of D=10 $sec^{-1}$.

In embodiments, the viscosity of the composition (A) and (B) has viscosity range between 100 to 1000 mPa·s at 25° C. and a shear rate of D=10 $s^{-1}$.

This level of viscosity is necessary for a sufficient processability in the manufacturing methods of the application where a film has to be formed by coaters or blades or where the inventive composition must pass small channels/nozzles at a low pressure e.g. needles of syringes.

In one embodiment of the invention the composition comprising high concentrations of component (A) is diluted with a solvent to achieve a level of viscosity for a reasonable processability as indicated. Solvent means any evaporable organic or inorganic liquid having a boiling point below 250° C. at 1033 mbar. It is therefore desirable to have a viscosity range for the component (A) in the inventive composition of 10 to 200000 mPa·s more preferred 50 to 50000 mPa·s at 25° C. at a shear rate D=10 $s^{-1}$, most preferred 50 to 5000 mPa·s at 25° C., most preferred 100 to 1000 mPa·s at 25° C. and a shear rate of D=10 $s^{-1}$. In order to achieve such a relative low viscosity it is necessary on one hand to use a low viscous polyorganosiloxane (B) and in particular an embodiment of (B) which can work against the built-up of viscosity induced by component (A). This is one of the reasons to use a polyorganosiloxane (B) in which (B) has one terminal group for an interaction with the filler surface and a second more inert terminal group for the separation of the particles to each other.

The asymmetrically terminal substituted polyorganosiloxane (B) can also serve therefore as process aid in the process for the synthesis of the metal oxide/hydroxide particles wherein a metal alkoxide precursor is submitted to a hydrolysis and a condensation process, and wherein the leaving moieties of alcohol are removed by know technologies, such esterification, extraction, evaporation and the like. In such condensation processes it is mandatory to control the particle size of the oxide/hydroxide in the course of the hydrolysis of the metal alkoxide. Another important step in the manufacturing of crystalline nano-sized metal oxide/hydroxide particles is the transformation from an amorphous modification into a crystalline modification. The asymmetrically terminal substituted polyorganosiloxane (B) can withstand for short time to the high temperature conditions which are necessary for this process step.

It is therefore in the scope of the invention to include a process for the manufacture of a crystalline component (A) according to the invention comprising the steps
  a) providing a dispersion of amorphous metal oxide/ hydroxide particles optionally in a solvent,
  b) admixing the dispersion with a polyorganosiloxane (B),
  c) heating the mixture up to 450° C.,
  d) optionally if necessary evaporating the solvent (E), and
  e) optionally admixing it with a further siloxane polymer (B).

After this process the crystalline metal oxide/hydroxide particles can be separated as dispersion or slurry and provided for the use in the inventive composition for making transparent films, coatings or articles.

The process for the manufacture of a curable transparent composition according to the invention comprising the steps
  i) providing a dispersion of a crystalline metal oxide/ hydroxide particles of component (A) in a solvent,
  ii) admixing (A) with the polyorganosiloxane (B),
  iii) optionally heating the mixture,
  iv) evaporating if necessary the solvent (E) optionally after admixing it with a further siloxane polymer (C) and a catalyst (D).

A composition according to embodiments of the invention comprises the metal oxide/hydroxide particles (A) in an amount from about 0.01 to 350 part per weight (pt.wt.) per 100 pt.wt. of polyorganosiloxane (B).

An exemplary composition comprises the metal oxide/ hydroxide particles (A) in an amount from about 0.001 to 95 weight %, (wt. %), more preferably 1 to 90 wt., a more preferred composition from about 25 to 85 wt. %, an even more preferred composition 35 to 75 wt. % related to component (B).

In one embodiment the inventive the composition comprises 350 pt.wt. component (A) of a metal oxide/hydroxide of a particle size below 200 nm comprising crystalline structures,
  100 pt.wt. of component (B) an epoxy-functionalized polydimethylsiloxane selected from a symmetrically or an asymmetrically substituted component (B) comprising epoxy groups $R^3$ or $R^6$,
  1 to 5 pt.wt. of an oninum salt of pentafluorophosphate as component (D)
  0.5-1 pt.wt. of a sensitizer.

In embodiments, the composition comprises symmetrically and asymmetrically substituted polyorganosiloxane (B) and it is much more suitable that the composition comprises only an asymmetrically polyorganosiloxane (B) whereby this component (B) has a refractive index $n_D^{20}$ of more than 1.43.

In another embodiment the inventive the composition comprises
  1-350 pt.wt. component (A) of a metal oxide/hydroxide of a particle size below 200 nm comprising crystalline structures,
  100 pt.wt. component (B) vinyl terminated polydiphenyldimethylsiloxane having more than 10 mol.-% phe$_2$SiO units,
  0 to 20 pt.wt. are of an asymmetrically substituted component (B) comprising the group $R^4$ and $R^{4*}$,
  1 to 5 pt.wt. of a SiH polydimethylsiloxane (B2) having more than 10 mol.-% phe$_2$SiO units,
  An organometal Pt-compound as component (D) providing 2 to 500 ppm Pt related to the components (A) to (C).

In third preferred embodiment the inventive the composition comprises
  1-350 pt.wt. component (A) of a metal oxide/hydroxide of a particle size below 200 nm comprising crystalline structures,
  100 pt.wt. are of an asymmetrically substituted component (B) comprising optical dense groups R, selected from the group which consist of $R^{22}$ and L-$R^{42}$,
  whereby more than 5 mol.-% of the siloxy units have substitutents $R^{22}$ and L-$R^{42}$,
  1 to 5 pt.wt. of a SiH polydimethylsiloxane (B2),
  an organometal Pt-compound as component (D) providing 2 to 500 ppm Pt related to the components (A) to (C).

It is desirable that the composition comprises symmetrically and an asymmetrically substituted polyorganosiloxane (B) and it is more desirable that the composition comprises only an asymmetrically polyorganosiloxane (B) whereby (B) has a refractive index $n_D^{20}$ of more than 1.43.

It is even more preferred that the asymmetrically polyorganosiloxane (B) having a refractive index $n_D^{20}$ of more than 1.43 consists of one group which can interact with the surface of the oxide/hydroxide (A) and a reactive group which can undergo a crosslinking reaction as defined above.

The invention includes also a process for curing the silicone composition according to the invention, wherein the components of (A), (B) and (C) as defined above are further mixed with at least one catalyst (D) selected from the group which consists of a heat or light-activatable radical initiator or a sensitizer, a heat or light-activatable hydrosilylation catalyst, a condensation catalyst and are submitted to a curing process wherein light, electromagnetic irradiation, heat, oxygen or humidity is applied, preferably at a temperature below 100° C., more preferably below 80° C.

The composition of the invention can be cured by reactions of a variety of reactive groups.

The reactive groups on the polyorganosiloxane (B) and component (C) are crosslinked by heat or light activation or diffusion of water or oxygen of the reactive groups $R^2$, $R^{22}$, $R^4$, $R^{42}$ or $R^7$ where these reactive group are selected from the group which consists of alkenyl, SiH, alkoxy, SiOH, amino, carboxy, epoxy, and thiol groups.

Depending on the process selected for the manufacture of the article a suitable process is chosen. There might be applications of the inventive composition where a curing of the composition is not necessary, e.g., where the refractive composition is enclosed and used in a transparent containment or any kind of it.

In the majority of applications a curing step is preferred, e.g., if a light guide or optical coating or other shaped articles shall be manufactured the composition of the invention is cured. If the application of heat is acceptable (<110° C. few seconds) a radical initiated curing process with a radical initiator can be suitable, e.g., using 0.1-2% of an organic peroxide and alkenyl siloxanes (B), but it is much better to use a heat assisted hydrosilylation since by-products of peroxides can be avoided. In those cases the inventive composition can be cured preferable by a hydrosilylation reaction between SiH and alkenyl groups with a usual hydrosilylation catalyst but applying the lowest amount of reaction retarders like alkynols or a vinyl siloxane having vicinal vinyl groups. If there are stronger limitations for the applied curing temperature the crosslinking step can be preferably achieved by the use of light activatable metal catalysts such platinum compounds as mentioned before. The last reaction is in particular preferred if thick sections must be cured, and therefore sensitizers must be avoided.

Other embodiments of light induced cure reactions make use of a radical initiated crosslinking reaction, e.g., suitable for acrylic, methacrylic, alkenyl, thiol groups attached to (B). In a third preferred embodiment a light induced cationic polymerization of epoxy groups with onium catalyst is used. This curing reaction is in particular useful for thin coatings or light guide, cladding materials of light guides.

The curing process for light curable compositions comprising in particular the polyorganosiloxanes (B) having groups selected from epoxy, alkenyl or thiol substituents can be achieved with light in the range of 250 to 600 nm. The usual preferred light sources are UV-lamps known in the art for light curing polyorganosiloxanes.

The composition of the invention can be cured and formed to shaped in principle in the range of about 0° C. up to about 180° C. applied in an open oven chamber or by the walls of a mold, if necessary a transparent mold or at least with a transparent window for compositions wherein the cure reaction is light activated.

The article can also be formed to a desired shape by passing through die of an extruder, as film applied with any coater, any blade, roll or in a mold optionally under pressure and then applying heat, or by self-leveling into any form, or by application of light or contact to humid air or oxygen to activate the curing process and fix the shaped form.

The cured composition is intended for the use as optical device or in other applications where a higher refractive index is necessary. In order achieve a transparent composition comprising the nano metal oxide/hydroxide (A) and the polyorganosiloxane (B) the difference in the refractive indices between both materials shall not exceed a certain threshold value.

The invention therefore provides a fluid, a film, a cured coat, or shaped article formed by an extrusion or by a molding process consisting of a composition which comprises at least one polyorganosiloxane (B) with a refractive index $n_D^{20}$ of about 1.43 at 25° C. or more.

The polyorganosiloxane (B) having a refractive index $n_D^{20}$ of about 1.43 or more are composed according to the invention in that at least more than 5 mol. % of the optical dense substituents $R^2$, $R^{22}$, $R^3$, $R^4$, $R^{42}$ exceed this concentration. Preferably the properties of a higher refractive index are achieved by the insertion of optical dense substituents $R^{22}$ and $R^{42}$ at a concentration of more than 10 mol. %, more preferably more than 20 mol. % of the optical dense groups $R^{22}$ and $R^{42}$ related to all siloxy units comprising.

The selected range of increased concentration for the optical dense substituents is one assumption.

The other assumption is that all substituents in particular $R^{22}$ and $R^{42}$ in the polyorganosiloxane (B) should have no light remarkable absorption (transmission>80% at 2 mm) or light scattering in the range of visible light between 350 to 2000 nm at, still acceptable between 400 to 1500 nm, but at minimum a (transmission>80% at 2 mm) between 400 to 1000 nm at 25° C., i.e. low absorption.

The inventive compositions comprising the metal oxide particles (A) and the polyorganosiloxane (B) have a refractive index $n_D^{20}$ after removal of the solvent in the range from about 1.50 to 1.80, preferably from about 1.50 to 1.70, even more preferred from about 1.50 to 1.65.

The preferred articles made according to the invention are therefore made out of a cured composition according to the invention applied as coat, as a shaped article made by an extrusion or molding process having a light transmission at wavelength between 300-2000 nm of about more than 85% at a thickness of 2 mm. The preferred compositions are showing a light transmission of about >90% or greater; more preferably about >95% or greater, even more preferred about 97% or greater measured for at specimen in a cuvette of an UV photometer at a wavelength of 400 nm and a thickness of 2 mm at 25° C.

The light absorption is measured as transmission of light for a concrete example at 400 nm or case wise at any distinct wavelength of interest in the range of 300 to 2000 nm.

In one embodiment the cured article has a gas permeability of a 1 mm thick sheet of about 50 $cm^3/m^2*24$ h*atm or greater; about 100 $cm^3/m^2*24$ h*atm, 200 $cm^3/m^2*24$ h*atm or greater; even about 500 $cm^3/m^2*24$ h*atm or greater. In one embodiment, the cured article can have a Shore hardness of about Shore A of 10° to about Shore D of 50°; from about Shore A of 20° to about Shore D 50°.

The polyorganosiloxane (B) comprising the surface modified metal oxide/hydroxide particles (A) can be used to make a variety of products for a variety of applications. The siloxane polymers can be used to form coatings or films that can be applied onto the surface of other materials or that can be used to form products of a desired shape. The cured polyorganosiloxane compositions formed therefrom can exhibit relatively high refractive indexes and excellent mechanical properties and also avoid other problems associated with polymers comprising usual polyorganosiloxanes and particles having a high density and a high refractive index. The intended applications for compositions of the invention include, but not limited to, contact lenses, intraocular lenses solid state lighting encapsulants (light emitting diodes, organic light emitting diodes, laser diodes), waveguides (both planar and "fiber" geometries), optical computing, optical storage media, antireflection coatings, conformal coatings, optical lenses, micro-lenses, automobile topcoats, paint formulations and topcoats, hair care products, gradient refractive index optical components, dynamic gradient refractive index components, etc.

Aspects of the present subject matter can be understood with reference to the following examples. The examples are provided to illustrate possible embodiments of the present subject matter and are not intended to limit the disclosed subject matter.

EXAMPLES

The nano-sized metal oxide/hydroxide particles tested in the composition of the invention was a zirconium oxide/hydroxide dispersion named SH-6 supplied by Pixelligent Inc., synthesized in a hydrothermal reaction of an alkoxy zirconate according to WO 2012/058271. The SH-6 oxide contains 50 wt. % solids of zirconia particles of 7-10 nm size in length dispersed in toluene, whereby the solids comprise >85 wt. % zirconium oxide.

Example 1

Synthesis of an Asymmetric Substituted Polyorganosiloxane n-$C_4H_9$-Sime$_2$-O-[me$_2$SiO]$_8$-Sime$_2$-$C_2H_4$—Si(Ome)$_3$ This asymmetric polyorganosiloxane (B) was synthesized for the use as a dispersion aid or surface modifying agent to be applied in the next examples of compositions with a zirconia oxide/hydroxide. The asymmetric polyorganosiloxane with one reactive end group was prepared, which is here a trimethoxysilyl group. The precursor of the asymmetric siloxane molecule was n-$C_4H_9$-$Sime_2$-O-[$me_2SiO$]s-$Sime_2$-H (MCR-H 07 from Gelest Inc.). It was reacted with vinyl trimethoxy silane in the presence of 10 ppm of Pt supplied by a Karstedt catalyst at 80° C. under N2 atm. The resultant product formation is confirmed by $^1$H and $^{29}$Si-NMR and found to be formed in quantitative yields. The product is filtered through a layer diatomaceous earth (Celite) and used as such for further experimentations.

Comparison Example: 2

The dispersion of the unmodified commercial zirconia SH-6 (2 g), without the inventive asymmetric polyorganosiloxane (B) was mixed into 91 g vinyl-terminated polydimethylsiloxane and an $MD^{vi}Q$ resin. The vinyl terminated polydimethylsiloxane 'P 1' as component (B) has a refractive index of 1.406 and chain length of about in average 420 dimethylsiloxy units.

The mixture of this polyorganosiloxane (B) and the zirconium oxide/hydroxide dispersion result in an opaque non-transparent mixture.

Comparison Example 3

Comparison example 2 is repeated whereby the polyorganosiloxane (B) is replaced by an usual commercial vinyl terminated polydimethylsiloxane with a viscosity of 200 mPa·s at 25° C. refractive index $n_D^{20}$=1.39. The composition is opaque non-transparent mixture which began to show phase separation after removal of solvents.

Comparison Example 4

Evaluation of M-$D_2D^{Ph}_2$-$D^{Vi}_2$-M ('Phe 2') $n_D^{20}$=1.499 without an Asymmetric Polyorgansiloxane (B)

Another mixture according to comparison example 2 was prepared wherein the vinyl-terminated polydimethyldiphenylsiloxane (B) 'Phe 1' of comparison example 2 has been replaced by a vinyl terminated polydimethyldiphenylsiloxane (B) M-$D_2$-$D^{Ph}_2$-$D^{Vi}_2$-M ('Phe 2') with a $n_D^{20}$=1.499. In this mixture the concentration of the zirconia dispersion SH-6 was increased of up to 50 and 60 wt. % calculated on solids of zirconia. This mixture is showing a homogenous transparent appearance in a photometer cuvette (10 mm). Nevertheless there is still a bluish slight extent of haze. The refractive indices were measured to be $n_D^{20}$=1.569 for 50 wt. % and $n_D^{20}$=1.588 for 60 wt. % zirconium oxide/hydroxide solids. This example demonstrates that the zirconium oxide/hydroxide solids can be dispersed to obtain a transparent composition wherein the refractive index of the total composition is above of the refractive index of the polyorganosiloxane (B) 25 mol. % phenylsiloxy units (=2/8) comprising the optical dense groups.

Comparison Example 5

Process Aid According to State of the Art

The evaluation of 3 additional alkoxysilanes as an example for process aids according to state of the art in a composition of a polyorganosiloxane of low refractive index and zirconia particles of SH-6 is shown in this example and in tab. 1. A composition was prepared wherein the polyorganosiloxane (B) of comparison example 4 is replaced by one polyorganosiloxane of lower refractive index 1.39 and to which the dispersion of the zirconia particles SH-6 acc. to comparison example 4 is admixed. In addition 3 different alkoxysilanes have been employed in order to evaluate their ability to work as possible dispersion aid.

The stirring conditions have been 40° C. for 30 min, whereby the solvent toluene and also the methanol of the alkoxysilanes were removed by evaporation under vacuum.

TABLE 1

| Comp. (A) solids SH-6 in PDMS (B) [wt. %] | Silane [wt %] | Silane type | Optical appearance |
|---|---|---|---|
| 50 | 10 | Vinyltrimethoxy silane | Opaque |
| 50 | 10 | Methacryloxy-propyltrimethoxysilane | Opaque |
| 50 | 10 | 1-octenyl-trimethoxysilane | Opaque |

This example demonstrate that the usual dispersion aids like the used alkoxysilanes of this test do not improve neither the transparency of the compositions comprising a non-inventive polyorganosiloxane and zirconium oxide/hydroxide particles nor do they improve the dispersibility of the metal oxide particles.

Comparison Example 6

Comparison example 4 is repeated whereby the polyorganosiloxane (B) the M-$D_2D^{Ph}_2$-$D^{Vi}_2$-M was replaced by a polydimethylsiloxanediol having a viscosity of 200 mPa·s at 25° C.

During the stirring process a strong viscosity increase was observed beyond 100000 mPa·s, i.e. the processability does not meet the requirements. In addition the composition was extreme opaque.

Example 7

Compositions Comprising $ZrO_2$ Particles SH-6 an Asymmetrically Substituted Polyorganosiloxane (B) According to the Invention In a first mixture 0.65 g of the asymmetric polyorganosiloxane (B) of example 1 is added to 13.02 g of the zirconia dispersion SH-6 (50 wt. % in toluene=6.5 g solids) and heated up to 60-70° C. for 1 hour to affect a possible reaction of the trialkoxysilyl groups of (B) with the reactive groups onto the surface of the zirconia oxide/hydroxide particles. The resultant dispersion has a clear appearance.

In a second it step 2.85 g of a second vinylterminated polydimethyldiphenylsiloxane (B) M-$D_2D^{Ph}_2$-$D^{Vi}_2$-M ('Phe 2') $n_D^{20}$=1.499 of comparison example 3 was added.

In a second part/mixture 0.4 g of the asymmetric polyorganosiloxane (B) of example 1 is were added to 6 g of the zirconia dispersion SH-6 (50 wt. % in toluene=3 g solids) and 1.6 g of a polydimethyldiphenylmethylhydrogensiloxane M-$D_2$-$D^{Ph}_2$-$D^{H}_4$-M (B2). After stirring the composition for 15 min at 60° C. the toluene was removed under vacuum. After evaporation a clear composition has been obtained showing high transparency with less or no bluish haze. The refractive index of the total composition is above of that the polyorganosiloxane (B) and is transparent.

TABLE 2

| Component (B) or (C) | Component (A) SH-6 [wt. %] | Component (B) asymm. (2) [wt. %] | optical appearance | RI $n_d^{20}$ |
|---|---|---|---|---|
| 3 | — | — | transparent, low haze, low viscous | 1.496 |
| 3 | 50 | — | Milky, white fluid | |
| 3 | 60 | 12 | Bluish haze, homogenous sol | 1.55 |
| 1 | — | — | transparent, low haze, low viscous | 1.50 |
| 1 | 50 | — | translucent, hazy sol | 1.57 |
| 1 | 60 | 12 | transparent, low haze, low viscous | 1.59 |

(1) Symmetric polymer (B1) Phe 2: M-D$_2$D$^{Ph}_2$-D$^{Vi}_2$-M
(2) Asymmetric polymer (B1): (meO)$_3$C$_2$H$_4$-Sime$_2$-O-D$_8$-Sime$_2$Bu
(3) Symmetric crosslinker (C) = polymer (B2) Phe 2: MD$_2$D$^{PH}_2$D$^H_2$M Example 8

Curable Compositions Comprising Metal Oxide (A) and Polyorganosiloxane (B)

8.1

A first part (K1) compositions is formed from a symmetric polyorganosiloxane (B) of the formula M-D$_2$D$^{Ph}_2$-D$^{Vi}_2$-M (Phe 2) and zirconia particles SH-6 (A) modified with the asymmetric polyorganosiloxane (B) of Example 1.

A second part (K2) is formed from a polydimethyldiphenylmethylhydrogensiloxane (B2) M-D$_2$-D$^{Ph}_2$-D$^H_4$-M and the zirconia component (A) modified with polyorganosiloxane (B) of Example 1 as part (K2). Table 2 illustrates the refractive indices of the mixture of the parts K1 and K2.

TABLE 3

| Polymer-rest to 100 wt. % | Content of zirconia SH-6 [wt. %] | Asymm. (B) no. [wt. %] | R.I. $n_D^{20}$ |
|---|---|---|---|
| MD$_2$D$^{Ph}_2$D$^{Vi}_2$M=Phe 2 (K1) | 0 | 0 | 1.499 |
| MD$_2$D$^{Ph}_2$D$^{Vi}_2$M (K1) | 64 | 6 | 1.604 |
| MD$_2$D$^{Ph}_2$D$^H_4$M (K2) | 64 | 10 | 1.590 |
| Pt* in Phe 2 (K3) | — | — | 1.5 |

*(K3) Part is a Pt Karstedt M$^{Vi}_2$ complex comprising 0.04 wt. % Pt in M-D$_2$D$^{Ph}_2$-D$^{Vi}_2$-M applied at 10 ppm Pt concentration in the formulation.

The example demonstrates that the curable compositions with the vinyl component (B)+component (A) as well with the crosslinker component (C) or (B2) and component (A) are showing increased refractive index. The single packages the parts K1 and K2 as well as the mixture of both are transparent with very low haze. The refractive index of the composition (A)+(B) is above of the refractive index of the symmetric and the asymmetric polyorganosiloxane (B).

The concentration of optical dense siloxy groups with R$^{22}$ is 25 mol. % (=2/8).

Example 8.2

Another set of reactive compositions (as part K1) and (K2) were admixed acc. to example 8.1. in order to measure the viscosities.

The part (K1) is composed of 52 wt. % ZrO2 SH-6 component (A), 8.1 wt. % of the asymmetric polyorganosiloxane (B1) (meO)$_3$C$_2$H$_4$-Sime$_2$-O-D$_8$-Sime$_2$Bu, 39.9 wt. % of the symmetric polyorganosiloxane (B1) a polydimethyldiphenylsiloxane vinyl terminated M-D$_2$-D$^{Ph}_2$-D$^{Vi}_2$-M to obtain a viscosity of 8.39 Pa·s at 21° C. and a shear rate D=10 rads/sec.

The part (K2) is composed of 64 wt. % n-ZrO2 component (A) SH-6, 10 wt. % of the asymm. polyorganosiloxane (B1) (meO)$_3$C$_2$H$_4$-Sime$_2$-O-D$_8$-Sime$_2$Bu, 26 wt. % of the symm. crosslinker (C) a polydimethyldiphenylmethylhydrogensiloxane (B2) M-D$_2$D$^{Ph}_2$-D$^H_2$-M trimethylsily-terminated to result a viscosity of 4.01 Pa·s at 21° C. and a shear rate D=10 rads/sec.

A mixture of the compositions were cured over 6 h at 100° C. whereby 10 ppm platinum is provided by a (K3) composition and submitted to a test where the discoloration has been measured expressed by the yellowness index and evaluated. Method: Macbeth Color Eye 7000 from Gretag Macbeth.

TABLE 4

| Composition Parts K1 + K2 of ex 7 | Ratio of K1:K2 | Optical appearance | R.I. $n_D^{20}$ of cured film |
|---|---|---|---|
| K1 + K2 + K3 (Pt 10 ppm) | 1:0.55 | Highly transparent & brittle | ~1.612 |

Since these cured compositions are suitable for applications in optical devices such as LED-lenses, light guides and other display applications it is required to maintain the clarity and colorless behavior for the function, e.g. as light guide. Any discoloration would be regarded as disadvantage. To evaluate the color properties of the film over time, the films are subjected to accelerated weathering conditions such as dry heat or wet heat for extended periods of time. The cured compositions of zirconia (A) and polyorganosiloxane (B) the polydimethyldiphenylsiloxane based films of example 8 were exposed to 85° C. and 85% relative humidity for 168 hours in order to simulate aging. It was found that there was no significant degradation of the cured composition in terms of discoloration demonstrated by the so-called La*b*-values and Yellowness Index. Table 5 illustrates test results of the cured films of compositions with polydimethyldiphenylsiloxane (B) without zirconia SH-6 component (A) and with component (A) under the aforementioned conditions.

TABLE 5

| Formulation acc. to example 7 | | Yellowness Index | L | a* | b* |
|---|---|---|---|---|---|
| Phe 2 no zirconia | Initial | 0.15 | 96.28 | −0.02 | 0.01 |
| Phe 2 no zirconia | Aged )$^2$ | 0.1 | 96.19 | −0.02 | 0.01 |
| Phe 2 + zirconia | Initial | 2.1 | 94.3 | −0.12 | 1.2 |
| Phe 2 + zirconia | Aged )$^2$ | 1.27 | 93.45 | −0.09 | 0.76 |

)$^2$ 85° C. and 85% relative humidity for 168 hours.
The value of the La*b* values and Yellowness Index are showing that the yellowing index decreased after ageing in both compositions with and without metal oxide (A).

Example 9

Composition with ZrO$_2$ Particles Component (A) and with an Asymmetric Epoxy-Trimethoxy Terminated Polyorganosiloxane (B) (me$_3$SiO)$_2$C$_2$H$_4$-Sime$_2$-O-[D]$_3$-Sime$_2$-(CH$_2$)$_3$—O—C$_3$H$_5$O 9.1.

A dispersion containing 50 g of ZrO$_2$ solids applied as 50 wt. % SH-6 dispersion in toluene was mixed under inert gas atmosphere with 5 g of the asymmetrically substituted epoxy- and trimethoxysilyl-terminated polyorganosiloxane (B) of the formula (me$_3$SiO)$_2$C$_2$H$_4$-Sime$_2$-O-[D]$_3$-Sime$_2$-(CH$_2$)$_3$—O—C$_3$H$_5$O and stirred for 2 hrs at 55-60° C. A transparent composition was obtained with no remarkable haze.

9.2.

The dispersion obtained in example 9.1. was further admixed with 5 g an symmetrically substituted polyorganosiloxane (B) with terminal epoxy substituents of the formula OC$_3$H$_5$O—(CH$_2$)$_3$Sime$_2$-O-[D]$_3$-Sime$_2$-(CH$_2$)$_3$—O—C$_3$H$_5$O.

A transparent composition could be achieved with no remarkable haze.

9.3.

Each of the composition of example 9.1 and 9.2 was then admixed with 10 g of a catalyst component (D) a solution of a bis(dodecylphenyl)idonium hexafluoroantimonate (47 wt. %) with sensitizer 2-isopropylthioxanthone (2.4%) and 4-isopropylthioxanthone (0.6%) in C12-C14-alkylglycidyl ethers in order to prepare a UV-light curable epoxy composition.

Solvent-free material films on substrates were made using a spin-coater. Upon the exposure of the even films to UV-light required for initiating the polymerization process, highly transparent, high refractive layers of the compositions of the invention have been received.

TABLE 6

| Component (A) ZrO$_2$ solids per SH-6 | Comp. (B) asymm. subst.)$^2$ | Comp. symm. (B))$^3$ | Catalyt (D))$^4$ | $n_D^{20}$ of the solid film 1 mm | Absorption loss |
|---|---|---|---|---|---|
| 5 | 0.5 | — | 1 | 1.716 )* | ~1 dB/cm )* |
| 5 | 0.5 | 0.5 | 1 | 1.625 )** | ~1 dB/cm )** |

)** $n_D^{20}$ at 633 nm
)* $n_D^{20}$ at 829 nm Films have been prepared on glass plate 5 x 5 x 0.7 cm (length * width * thickness) whereby a solution was spincoating on a glass plate for 30 sec at 1500 rpm. The refractive index measurements were done by ellipsometry with a Metricon-model 2010/M at 633 nm and 829 nm, more information via: http://www.metricon.com/model-2010/
)$^2$ asymm.component (B) as defined in example 8.2
)$^3$ symm.component (B) as defined in example 8.2
)$^4$ component (D) as defined in example 8.3.

The optical measurements have been conducted by TNO (Nederlandse Organisatie voor Toegepast-Natuurwetenschappelijk Onderzoek) Eindhoven, The Netherlands). We kindly would like to express our appreciation to TNO for their continuous help and support.

The polyorganosiloxane of example 9.1 contains 20 mol. % (=1/5); the symmetrically substituted polyorganosiloxane (B) of example 9.2 contains 25 mol. % (=2/8) of the optical dense group R$^3$ respectively R$^{42}$.

The results in tab. 6 are showing that the metal oxide particles of component (A) and polyorganosiloxanes (B) comprising the asymmetric polyorganosiloxane of the invention could now be dispersed resulting in transparent composition having the refractive indices shown in table 5.

The examples show in addition that the metal oxide component (A) can already be dispersed in high concentration and provide a curable composition if the asymmetrically substituted polyorganosiloxane component (B) is used only.

Embodiments of the invention have been described above and modification and alterations may occur to others upon the reading and understanding of this specification. The claims as follows are intended to include all modifications and alterations insofar as they come within the scope of the claims or the equivalent thereof.

The invention claimed is:

1. A composition comprising:
(A) metal oxide particles or a metal hydroxide particle; and
(B) a polyorganosiloxane selected from an asymmetrically substituted polyorganosiloxane of the formula (IIIb):

R$^4$-{-L[SiR$_2$O]$_p$—SiR$_2$}$_m$-L-R$^{4*}$     (IIIb)

where:
m is 1 to 7 and p is 1 to 9;
R is selected from monovalent C1 to C22-alkyl, a C2-C22-alkenyl, C6-C22-cycloalkenyl, C7-C22-bicycloalkenyl, C6-C22-alkenylarylalkyl; a group -L-R$^4$; and R$^4$;
R4 and R4* are each independently selected from C1 to C22-alkyl; a C2-C22-alkenyl; C6-C22-cycloalkenyl; C7-C22-bicycloalkenyl; C6-C22-alkenylarylalkyl; (R$^1$O)$_x$R$^1_{3-x}$Si—, wherein x is 1-3, R$^1$ is a monovalent C1-C22 alkyl; an ionic group derived from esters of carboxylic acids, a S-acid, or a P-acid selected from R$^9$—C(O)—O—, (R$^9$—O)$_2$—P(O)—O—, (R$^9$—O)$_2$—P(O)—, (R$^9$—O)$_2$—P—O—, —NHR$^9$—CH$_2$—COOH, —NHR$^9$—CH$_2$—O—S(O)$_2$(OH), —S—S(O)$_2$(OH)$_2$, where R$^9$ is hydrogen, a C1-C8 alkyl, a C2-C8 alkenyl, or Me$_3$Si; C6-C22-cycloalkyl; C6-C12-cyclothioalkyl; C7-C22-bicycloalkyl; C6-C22-aryl; C5-C12-hetero-N, —O, —S-aryl; C8-C22-polycyclic aryl; C7-C22-alkylaryl; C7-C22-arylalkyl; C8-C22-arylalkylenearylalkyl; R$^6_x$R$^1_{3-x}$Si— where x of R$^6_x$R$^1_{3-x}$Si— is 1-3, R$^1$ of R$^6_x$R$^1_{3-x}$Si— is a C1-C22 alkyl, and R$^6$ is C6-C10-aryl, C7-C12-arylalkyl, C6-C12-cycloalkyl, C7-C16-bicycloalkyl, epoxy C3-C12-epoxy alkyl, C6-C12-cycloalkyl, epoxy C7-C16-bicycloalkyl, C6-C12-thiocycloalkyl, or C5-C12-hetero-N, —O, —S-aryl;
L is independently selected from a single bond and a C1 to C12-alkylene group, which can be interrupted by one or more —O—, or —NR$^9$—C(O)—, and/or —NR$^9$—, urethane —OC(O)NR$^9$—, urea —NR$^9$HC(O)NR$^9$—, moieties, and substituted by one or more OH groups, bonded via a carbon bond to the silicon atom of the siloxy unit, where R$^9$ in L selected from a C1-C8 alkyl, a C2-C8 alkenyl, or Me$_3$Si; and
where R$^4$ and R$^{4*}$ are different from each other.

2. The composition of claim 1, wherein the polyorganosiloxane (B) comprises a polyorganosiloxane selected from the group of the structural formulas (Va)

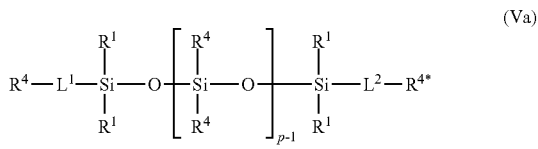

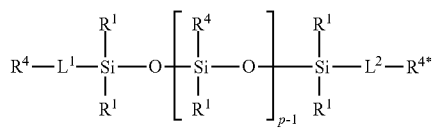
(Vb)

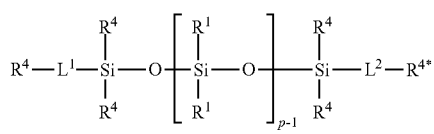
(Vc)

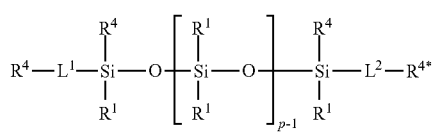
(Vd)

$R^1$=methyl, $L^1$ and $L^2$ are divalent C1 to C8-alkylene groups, which can be interrupted by one or more O, N—C(O)—, and/or —$NR^9$— moieties, and substituted by one or more OH groups.

3. The composition of claim 2, wherein L1 is a bond, L2 is a C1-C12 alkylene, R4 is a C1-C22 alkyl, and R4* is $(R^1O)_x R^1_{3-x}Si-$.

4. The composition of claim 3, wherein x in R4* is 3, and R1 is methyl.

5. The composition of claim 3, wherein R4 is a C1-C4 alkyl.

6. The composition of claim 3, wherein R4 is n-butyl.

7. The composition of claim 3, wherein p is 4 to 9.

8. The composition of claim 1, wherein p is 4 to 9.

9. The composition of claim 1, wherein p is 4 or 9.

10. The composition of claim 3, wherein R4 is a C1-C4 alkyl, m is 1, and p is 4 to 9.

11. The composition of claim 1, wherein the composition further comprises a crosslinker (C) selected from the group which consists of silanes and siloxanes having reactive groups towards the reactive groups of component (B), whereby the reactive substituents of the crosslinker component (C) are selected from the group which consists of SiH, alkenyl, alkoxy, amino, carboxy, epoxy, and thiol groups.

12. The composition of claim 1, wherein the composition further comprises a crosslinker (C) selected from the group of hydrocarbons without silicon atoms.

13. The composition of claim 1, wherein the metal in the metal oxide or metal hydroxide component (A) is selected from the group of Ti, Zr, Hf, Sn, Ce, Al, As, In, Zn, Ge, Sb, Cr, Cd, W, Mo and Nb.

14. The composition of claim 1, wherein the metal oxide or metal hydroxide component (A) has particles with a length in the range of less than 200 nm.

15. The composition according to claim 1 comprising the metal oxide or metal hydroxide particles (A) in an amount from about 0.001 to 95 weight percent relative to component (B).

16. A fluid, a film, a casted or dispensed coat, or a shaped article formed by an extrusion or by a molding process consisting of a composition of claim 1, which comprises at least one polyorganosiloxane (B) with a refractive index $n_D^{20}$ of about 1.43 or more.

* * * * *